US011074117B2

(12) United States Patent
Li et al.

(10) Patent No.: US 11,074,117 B2
(45) Date of Patent: Jul. 27, 2021

(54) COPYING AND PASTING METHOD, DATA PROCESSING APPARATUS, AND USER EQUIPMENT

(71) Applicant: Huawei Technologies Co., Ltd., Shenzhen (CN)

(72) Inventors: Duan Li, Shenzhen (CN); Xueyan Huang, Shenzhen (CN); Rubin Cai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/834,659

(22) Filed: Mar. 30, 2020

(65) Prior Publication Data
US 2020/0226007 A1 Jul. 16, 2020

Related U.S. Application Data

(63) Continuation of application No. PCT/CN2018/108621, filed on Sep. 29, 2018.

(30) Foreign Application Priority Data

Sep. 30, 2017 (CN) .......................... 201710923598.5
Nov. 3, 2017 (CN) .......................... 201711071730.0

(51) Int. Cl.
*G06F 9/54* (2006.01)
*G06F 3/0482* (2013.01)
(Continued)

(52) U.S. Cl.
CPC ............ *G06F 9/543* (2013.01); *G06F 3/0482* (2013.01); *G06F 3/04842* (2013.01); *G06F 21/32* (2013.01)

(58) Field of Classification Search
None
See application file for complete search history.

(56) References Cited

U.S. PATENT DOCUMENTS 9,043,900 B1   5/2015  Kim et al.
2010/0231356 A1  9/2010  Kim
(Continued)

FOREIGN PATENT DOCUMENTS

CN    101833651 A    9/2010
CN    104036200 A    9/2014
(Continued)

OTHER PUBLICATIONS

CN/201711071730.0, Office Action/Search Report, dated Feb. 3, 2021.

*Primary Examiner* — Cesar B Paula
*Assistant Examiner* — John M Heffington
(74) *Attorney, Agent, or Firm* — Leydig, Voit & Mayer, Ltd.

(57) ABSTRACT

A copying and pasting method is provided, which includes: obtaining a first to-be-recognized fingerprint; selecting, if the first to-be-recognized fingerprint is a first preset fingerprint, copied content from a to-be-processed interface based on a touch operation acting on a touchscreen; obtaining a pasting instruction; and pasting the copied content into a target area according to the pasting instruction. This application further provides a data processing apparatus and user equipment that may implement the foregoing method. According to this application, copying and pasting efficiency is improved.

20 Claims, 42 Drawing Sheets

(51) Int. Cl.
    *G06F 3/0484*     (2013.01)
    *G06F 21/32*     (2013.01)

(56) References Cited

U.S. PATENT DOCUMENTS

| | | |
|---|---|---|
| 2011/0239306 A1* | 9/2011 | Avni .................... G06F 21/554 |
| | | 726/26 |
| 2014/0101737 A1 | 4/2014 | Rhee |
| 2015/0135108 A1 | 5/2015 | Pope et al. |
| 2015/0220767 A1* | 8/2015 | Yoon .................. G06K 9/00006 |
| | | 382/124 |
| 2015/0324569 A1 | 11/2015 | Hong et al. |
| 2016/0011767 A1 | 1/2016 | Jung et al. |
| 2016/0042166 A1 | 2/2016 | Kang et al. |
| 2016/0154686 A1 | 6/2016 | Huang et al. |
| 2017/0255771 A1* | 9/2017 | Miyakawa ............ G06F 3/0482 |

FOREIGN PATENT DOCUMENTS

| | | |
|---|---|---|
| CN | 104346092 A | 2/2015 |
| CN | 104360990 A | 2/2015 |
| CN | 104407787 A | 3/2015 |
| CN | 104823434 A | 8/2015 |
| CN | 105426094 A | 3/2016 |
| CN | 105574383 A | 5/2016 |
| CN | 105574390 A | 5/2016 |
| CN | 105574393 A | 5/2016 |
| CN | 106095243 A | 11/2016 |
| CN | 106096511 A | 11/2016 |
| CN | 106133748 A | 11/2016 |
| CN | 106487862 A | 3/2017 |
| CN | 107918563 A | 4/2018 |
| JP | 2016139241 A | 8/2016 |
| WO | 2015072677 A1 | 5/2015 |

\* cited by examiner

FIG. 3

的《汽车销售管理办法》将于7月1日起施行，不再强制性要求品牌授权，实行授权和非授权两种模式并行。管理办法实施后，汽车配件 Copy  Word sharing  Search 给汽车超市、汽车卖场、汽车电商，消费者不必非去4S店买原厂配件、修车。

吉利汽车子品牌领克发新车，一部量产小型SUV和一部四门概念轿车。 领克01是量产SUV，使用沃尔沃和吉利研发的CMA平台、并取得沃尔沃授权，使用期研发的1.5升和2.0升涡轮增压发动机。据了解，领克量产车型将在沃尔沃路桥工厂生产。路桥工厂位于浙江省台州市，是沃尔沃中国三大生产基地（大庆、成都、路桥）之一。

吉利汽车子品牌领克发新车，一部量产小型SUV和一部四门概念轿车。领克01是量产SUV，使用沃尔沃和吉利研发的CMA平台、并取得沃尔沃授权，使用期研发的1.5升和2.0升涡轮增压发动机。据了解，领克量产车型将在沃尔沃路桥工厂生产。路桥工厂位于浙江省台州市，是沃尔沃中国三大生产基地（大庆、成都、路桥）之一。

| Copy | Word sharing | Search |

COPYING AND PASTING METHOD, DATA PROCESSING APPARATUS, AND USER EQUIPMENT

CROSS-REFERENCE TO RELATED APPLICATIONS

This application is a continuation of International Application No. PCT/CN2018/108621, filed on Sep. 29, 2018, which claims priority to Chinese Patent Application No. 201711071730.0, filed on Nov. 3, 2017 and priority to Chinese Patent Application No. 201710923598.5, filed on Sep. 30, 2017. The disclosures of the aforementioned applications are hereby incorporated by reference in their entireties.

TECHNICAL FIELD

Embodiments of this application relate to the field of computer technologies, and in particular, to a copying and pasting method, a data processing apparatus, and user equipment.

BACKGROUND

A copying and pasting operation is one of operations usually performed on user equipment, and a user usually needs to copy, in information content such as literature, news, or instant messaging, a part that the user requires, and paste the copied part to an application such as note/memo, chat, or agenda.

In the prior art, a copying and pasting operation method is roughly described as follows:

During copying, touch and hold is first performed on an application interface, to invoke an operation menu, where the operation menu includes options such as "copying", "word sharing", and "search" (as shown in FIG. 1), and then information head and tail identifiers are dragged, to determine a copying range; and the "copying" option is tapped. During pasting, the user first switches to an application on which pasting is to be performed, such as "Evernote", performs touch and hold on a location at which information is to be inserted, to invoke an operation menu, and then taps "past", to paste copied content to the insertion location, as shown in FIG. 2. When there is a relatively large amount of copied content, for example, copied content spans a plurality of screen-length pages, the user needs to slide pages downward a plurality of times, and slide an information tail identifier downward a plurality of times. As shown in FIG. 3, the user first drags an information tail identifier to a location of "bing xing" on a current page, then operates "downward page slide" to view a next page (as shown in FIG. 4), then slides the information tail identifier downward, and drags the information tail identifier to a location of "bei xuan" on the current page (as shown in FIG. 5), thereby completing content copying of a plurality of pages. During the operation, if another location on the page is tapped through a misoperation, the copied content is canceled, and the user needs to re-find the location at which the information begins (a location of "ri fa bu gong gao" shown in FIG. 3) and operate once again.

It can be learned from the foregoing that, the existing copying and pasting operation includes many steps, and has quite low efficiency. When there is a relatively large amount of copied content, and cross-page copying is performed, the user needs to perform the slide operation a plurality of times and drag the copy tail identifier a plurality of times. Consequently, operations are quite inconvenient, and user experience is poor.

SUMMARY

This application provides a copying and pasting method, to improve copying and pasting efficiency.

A first aspect provides a copying and pasting method, including: obtaining a first to-be-recognized fingerprint; selecting, if the first to-be-recognized fingerprint is a first preset fingerprint, copied content from a to-be-processed interface based on a touch operation acting on a touchscreen; obtaining a pasting instruction; and pasting the copied content into a target area according to the pasting instruction. The target area is a pastable area. Based on this implementation, if the obtained first to-be-recognized fingerprint is the first preset fingerprint, a copying function may be directly triggered through a fingerprint, an operation menu does not need to be invoked, and a function option of "copying" does not need to be selected either. Therefore, operation steps during copying and pasting can be reduced, thereby improving copying and pasting efficiency.

In a possible implementation, the obtaining a first to-be-recognized fingerprint specifically includes: obtaining, by using a fingerprint sensor when a touch operation acting on the touchscreen is detected, a fingerprint used for the touch operation; and using the fingerprint used for the touch operation as the first to-be-recognized fingerprint. Based on this implementation, when a finger is in contact with the screen, the fingerprint sensor is awakened, and the copying function may be triggered during screen touch, thereby not only improving copying and pasting efficiency, but also having good user experience.

In another possible implementation, the obtaining a first to-be-recognized fingerprint specifically includes: detecting a touch operation acting on the touchscreen; awakening a fingerprint sensor when an operation area of the touch operation is an interface of a preset application program run on a foreground; and obtaining, by using the fingerprint sensor, a fingerprint used for the touch operation, and using the fingerprint used for the touch operation as the first to-be-recognized fingerprint. The preset application program is an application program having a copyable object, for example, a document application, an SMS message, or a web page. Based on this implementation, the copying function is triggered only when a user touches the interface of the preset application program that is being run on the foreground. In this way, not only start of the fingerprint sensor can be prevented when the application program is not run, but also trigger of the copying function can be prevented when the user plays a game or watches a video, thereby satisfying an effective requirement of the user.

In another possible implementation, the fingerprint sensor is disposed below the touchscreen. In this way, while the user performs a touch operation on the touchscreen, the fingerprint sensor can detect a fingerprint used for the touch operation. Further, a fingerprint detection area of the fingerprint sensor is not less than a screen area of the touchscreen. In this way, while the user performs a touch operation on any location on the touchscreen, the fingerprint sensor can detect a fingerprint used for the touch operation. Furthermore, the fingerprint sensor may be disposed below a display panel, so as not to affect displaying of the display panel.

In another possible implementation, the selecting copied content from a to-be-processed interface based on a touch operation acting on a touchscreen specifically includes:

selecting the copied content from the to-be-processed interface based on a touch track of the touch operation on the touchscreen. The touch track is a slide track of a finger on the screen. Based on this implementation, a touch track within a period of time may be recorded, and the copied content is selected based on the touch track, thereby increasing content copying means.

In another possible implementation, the selecting the copied content from the to-be-processed interface based on a touch track of the touch operation on the touchscreen specifically includes: using text information as the copied content when content corresponding to the touch track includes the text information. Based on this implementation, when a finger slides to select a piece of text information, the selected text information may be used as the copied content. In this way, selected content may be directly used as the copied content, having advantages of speediness and convenience.

In another possible implementation, the selecting the copied content from the to-be-processed interface based on a touch track of the touch operation on the touchscreen specifically includes: displaying, when content corresponding to the touch track includes text information, an option of converting a text into a picture; and converting the text information into a picture when the option of converting a text into a picture is selected, and using the picture as the copied content. This implementation provides a function of converting selected text information into a picture, thereby increasing an application range of copying and pasting.

In another possible implementation, the selecting the copied content from the to-be-processed interface based on a touch track of the touch operation on the touchscreen specifically includes: using, when the touch track forms a closed area and the closed area includes a picture, the picture in the closed area as the copied content. This implementation provides a method for selecting a picture in a closed area as the copied content, thereby increasing content copying means.

In another possible implementation, the selecting copied content from a to-be-processed interface based on a touch operation acting on a touchscreen specifically includes: using, when content corresponding to a touch location is a multimedia file, the multimedia file as the copied content. Based on this implementation, the multimedia file may be quickly copied.

In another possible implementation, the selecting copied content from a to-be-processed interface based on a touch operation acting on a touchscreen specifically includes: determining a touch location of the touch operation on the touchscreen; and using, when content corresponding to the touch location is a thumbnail, an original picture corresponding to the thumbnail as the copied content. Based on this implementation, the original picture of the thumbnail may be used as the copied content, thereby increasing an application range of copying and pasting.

In another possible implementation, the pasting the copied content into a target area according to the pasting instruction specifically includes: using a touch location of one more touch operation on the touchscreen as one more touch location; and pasting, according to the pasting instruction, the copied content after content corresponding to the one more touch location. Based on this implementation, after the copied content is selected based on the touch operation, the copied content may be pasted to a designated location. For example, if the designated location is between two words, the copied content is inserted between the two words.

In another possible implementation, the pasting the copied content into a target area according to the pasting instruction specifically includes: pasting, when the target area is an image editing area, the copied content to a layer located on the top of the image editing area. Based on this implementation, the copied content such as a word or a picture may be pasted into the image editing area, thereby increasing an application range of pasting.

In another possible implementation, after the pasting the copied content into a target area according to the pasting instruction, when the target area is a dialog box of a communication application program, the copied content is used as to-be-sent content. Based on this implementation, when the target area is the dialog box of the communication application program, the copied content may be directly sent to a receiving party. This saves steps of tapping and sending by a sending party, and provides a method for quickly sending the copied content.

In another possible implementation, the selecting copied content from a to-be-processed interface based on a touch operation acting on a touchscreen specifically includes: selecting, when the touch operation includes a first tapping operation and a second tapping operation, a first tapping location from an area in which the first tapping operation is in contact with the touchscreen, where the first to-be-recognized fingerprint is a fingerprint used for the first tapping operation; obtaining the second tapping operation after it is detected that the first tapping operation ends; selecting, when a fingerprint used for the second tapping operation is the first preset fingerprint, a second tapping location from an area in which the second tapping operation is in contact with the touchscreen; and selecting, if content corresponding to the first tapping location and content corresponding to the second tapping location both belong to the to-be-processed interface, the copied content from the to-be-processed interface based on the first tapping location and the second tapping location. Based on this implementation, if a fingerprint used for a tapping operation is the first preset fingerprint, the copied content may be selected through two tapping operations, thereby increasing content copying means.

Further, after the first tapping location and the second tapping location are obtained, if the content corresponding to the first tapping location and the content corresponding to the second tapping location both belong to a non-pastable area in the to-be-processed interface, the copied content is selected from the non-pastable area based on the first tapping location and the second tapping location. Based on this implementation, if a fingerprint used for a tapping operation is the first preset fingerprint, the copied content is selected from the non-pastable area through two tapping operations, and pasted in a pastable area through a touch operation.

In another possible implementation, the selecting the copied content from the to-be-processed interface based on the first tapping location and the second tapping location specifically includes: using text information corresponding to the first tapping location as a start point, using text information corresponding to the second tapping location as an end point, and selecting text information from the start point to the end point as the copied content. Based on this implementation, text information may be selected in a cross-page manner, and text information of a plurality of pages is used as the copied content, thereby providing a method for quickly selecting a large paragraph of text.

In another possible implementation, the selecting the copied content from the to-be-processed interface based on the first tapping location and the second tapping location specifically includes: generating, based on interface coordinates corresponding to the first tapping location and interface coordinates corresponding to the second tapping location, a screenshot area in the to-be-processed interface according to a preset area generation rule, and using a pattern in the screenshot area as the copied content. This implementation provides a feasible solution for selecting a pattern in a screenshot area through two tapping operations and using the selected pattern as the copied content, thereby increasing use scenarios of copying and pasting.

In another possible implementation, the selecting copied content from a to-be-processed interface based on a touch operation acting on a touchscreen specifically includes: using, when the touch operation includes a plurality of slide operations and the plurality of slide operations act on the to-be-processed interface, content corresponding to the plurality of slide operations as the copied content. Based on this implementation, if a fingerprint used for the touch operation is the first preset fingerprint, the copied content is selected through a plurality of slide operations, thereby increasing content copying means.

In another possible implementation, the obtaining a pasting instruction specifically includes: detecting, after the touch operation ends, one more touch operation acting on the target area; displaying, when a time length for which the one more touch operation has been in contact with the touchscreen reaches a preset time length, an operation menu including a pasting option; and obtaining the pasting instruction when the pasting option is selected. Based on this implementation, after the copied content is quickly selected by using a fingerprint, a method for implementing a pasting function is provided.

In another possible implementation, the obtaining a pasting instruction specifically includes: detecting, after the touch operation ends, one more touch operation acting on the target area; and obtaining the pasting instruction when a fingerprint used for the one more touch operation is a second preset fingerprint. Based on this implementation, after the copied content is quickly selected by using the first preset fingerprint, the copied content may be pasted into the target area by using the second preset fingerprint, having advantages of speediness and convenience.

In another possible implementation, after the selecting copied content from a to-be-processed interface based on a touch operation acting on a touchscreen, when a slide operation is detected in a non-pastable area of the to-be-processed interface, the copied content is cleared. The to-be-processed interface includes the pastable area and the non-pastable area. Based on this implementation, when the copied content does not satisfy a user requirement, the copied content may be quickly cleared by sliding in the non-pastable area, having advantages of convenience and speediness.

In another possible implementation, after the selecting copied content from a to-be-processed interface based on a touch operation acting on a touchscreen, when it is detected that a speed at which a touch object moves to a side of the screen is greater than a preset speed, the copied content is cleared. Based on this implementation, when a finger quickly slides to an edge of the screen, the copied content may be cleared, thereby implementing a function of clearing the copied content.

In another possible implementation, after the selecting copied content from a to-be-processed interface based on a touch operation acting on a touchscreen, when a double-tapping operation acting on an editable area of the to-be-processed interface is detected, the copied content is cleared. The double-tapping operation is an operation of performing tapping twice within a specified time. A time length of the specified time is relatively small, for example, 0.5 second or 1 second. Based on this implementation, when the editable area is double-tapped, the copied content may be cleared, thereby implementing a function of clearing the copied content.

A second aspect provides a copying and pasting method. The method includes: selecting content based on a first touch operation acting on a touchscreen, displaying a copying option, and using the selected content as copied content when the copying option is selected; and pasting the copied content into a target area when a second touch operation acting on the target area is detected and a fingerprint used for the second touch operation is a preset fingerprint. A fingerprint used for the first touch operation is not the preset fingerprint, and the target area is a pastable area. For example, a fingerprint of a finger A is the preset fingerprint, a fingerprint of a finger B is not the preset fingerprint, a menu including the copying option may be invoked by using the finger B, to perform a copying function, a pasting function may be directly performed by using the finger A, and a menu including a pasting option does not need to be invoked, thereby saving steps during pasting and improving pasting efficiency. Moreover, the pasting function can be performed by using only the preset fingerprint, and the pasting function cannot be performed by using another fingerprint, thereby avoiding a misoperation.

In a possible implementation, before the copying option is selected, a cancelation option is displayed after the content is selected based on the first touch operation acting on the touchscreen; and the copied content is cleared when the cancelation option is selected. Based on this implementation, when a user incorrectly selects an object, the selected object may be canceled, thereby satisfying a user requirement.

In a possible implementation, the displaying a copying option specifically includes: awakening a fingerprint sensor when an operation area of the first touch operation is an interface of a preset application run on a foreground; obtaining, by using the fingerprint sensor, the fingerprint used for the first touch operation; and displaying the copying option when the fingerprint used for the first touch operation is not the preset fingerprint. The preset application program is an application program having a copyable object, for example, a document application, an SMS message, or a web page. Based on this implementation, a content copying method is provided for a case in which a fingerprint used for a touch operation is not the preset fingerprint.

In a possible implementation, the obtaining a fingerprint used for the second touch operation specifically includes: awakening the fingerprint sensor when the target area is the interface of the preset application run on the foreground; and obtaining, by using the fingerprint sensor, the fingerprint used for the second touch operation. The preset application program is an application program having a copyable object, for example, a document application, an SMS message, or a web page. Only when the preset application program that is being run is touched, the fingerprint sensor is awakened to obtain a fingerprint. In this way, not only start of the fingerprint sensor can be prevented when the application program is not run, but also trigger of the copying function can be prevented when the user plays a game or watches a video, thereby satisfying an effective requirement of the user.

A third aspect provides a data processing apparatus, having a function of implementing the copying and pasting method provided in the first aspect. The function may be implemented by hardware, or may be implemented by hardware by executing corresponding software. The hardware or software includes one or more modules corresponding to the foregoing function. The module may be software and/or hardware.

A fourth aspect provides a data processing apparatus, having a function of implementing the copying and pasting method provided in the second aspect. The function may be implemented by hardware, or may be implemented by hardware by executing corresponding software. The hardware or software includes one or more modules corresponding to the foregoing function. The module may be software and/or hardware.

A fifth aspect provides user equipment, having a function of implementing the copying and pasting method provided in the first aspect. The function may be implemented by hardware, or may be implemented by hardware by executing corresponding software. The hardware or software includes one or more modules corresponding to the foregoing function. The module may be software and/or hardware.

A sixth aspect provides user equipment, having a function of implementing the copying and pasting method provided in the second aspect. The function may be implemented by hardware, or may be implemented by hardware by executing corresponding software. The hardware or software includes one or more modules corresponding to the foregoing function. The module may be software and/or hardware.

In the data processing apparatus and the user equipment in the third to the sixth aspects, the hardware may be hardware such as a CPU, a memory, a touchscreen, or a fingerprint sensor, and the software may be a software program run on a CPU.

According to a seventh aspect, an embodiment of this application discloses an electronic device (for example, various electronic mobile devices such as a mobile phone, a notebook computer, and a computer), the electronic device has a touchscreen-integrated fingerprint sensor or has a conventional fingerprint sensor not integrated into a touchscreen, and the electronic device further includes a CPU and a memory, where the memory is configured to store a software instruction required for performing the method according to the foregoing aspects and the implementations of the aspects, and the CPU is configured to read the software instruction and perform the method according to the foregoing aspects and the implementations of the aspects.

According to an eighth aspect, an embodiment of this application provides another method for performing quick copying and/or quick pasting by using a fingerprint. In this embodiment, a fingerprint sensor may be not integrated together with an electronic device at delivery of the electronic device, that is, may be used as an accessory of the electronic device. For example, the fingerprint sensor may be individually made into an independent hardware device, and then connected to an existing electronic device (for example, a computer, a notebook computer, or a mobile phone) in a wireless or wired manner. Certainly, the fingerprint sensor may alternatively be integrated into some existing peripherals (for example, a keyboard and a mouse).

In an example in which the fingerprint sensor is integrated into a mouse, a user may perform quick copying and/or pasting by using the mouse having the fingerprint sensor. For example, the fingerprint sensor may be disposed at a location of a left button of the mouse. When the user presses and holds the left button, a fingerprint is recognized. If the fingerprint is the same as a preset fingerprint, selected content is copied (selection may still be performed in an existing manner of pressing and holding the left button and moving the mouse), and then the left button is released to complete copying. Pasting may also be performed based on a fingerprint or in a regular manner. For details, refer to the foregoing embodiments. Details are not described herein again.

In this embodiment, even if the electronic device has no fingerprint sensor, quick copying and/or pasting may still be implemented through an external fingerprint sensor.

According to a ninth aspect, an embodiment of this application provides a computer readable storage medium. The computer readable storage medium stores an instruction, and when the instruction is run on a computer, the computer is enabled to perform the method according to the foregoing aspects and the implementations of the aspects.

According to a tenth aspect, an embodiment of this application provides a computer program product including an instruction. When the computer program product is run on a computer, the computer is enabled to perform the method according to the foregoing aspects and the implementations of the aspects.

In each embodiment of this application, if the obtained first to-be-recognized fingerprint is the first preset fingerprint, the copied content may be selected from the to-be-processed interface based on the touch operation acting on the touchscreen; and after the pasting instruction is obtained, the copied content is pasted into the target area according to the pasting instruction. Based on this application, the copying function may be directly triggered through a fingerprint, the operation menu does not need to be invoked, and the function option of "copying" does not need to be selected either. Therefore, it can be learned that, based on this application, the operation steps during copying and pasting are reduced, and the copying and pasting efficiency can be improved.

BRIEF DESCRIPTION OF DRAWINGS

FIG. 3 to FIG. 5 are schematic diagrams of cross-page copying and pasting in the prior art;

DESCRIPTION OF EMBODIMENTS

This application relates to a copying and pasting method on user equipment. The user equipment may include a mobile phone, a personal digital assistant (PDA), a point of sales (POS), a tablet computer, a notebook computer, a smartwatch, a smart TV, an in-vehicle computer, or the like.

Figure 1:
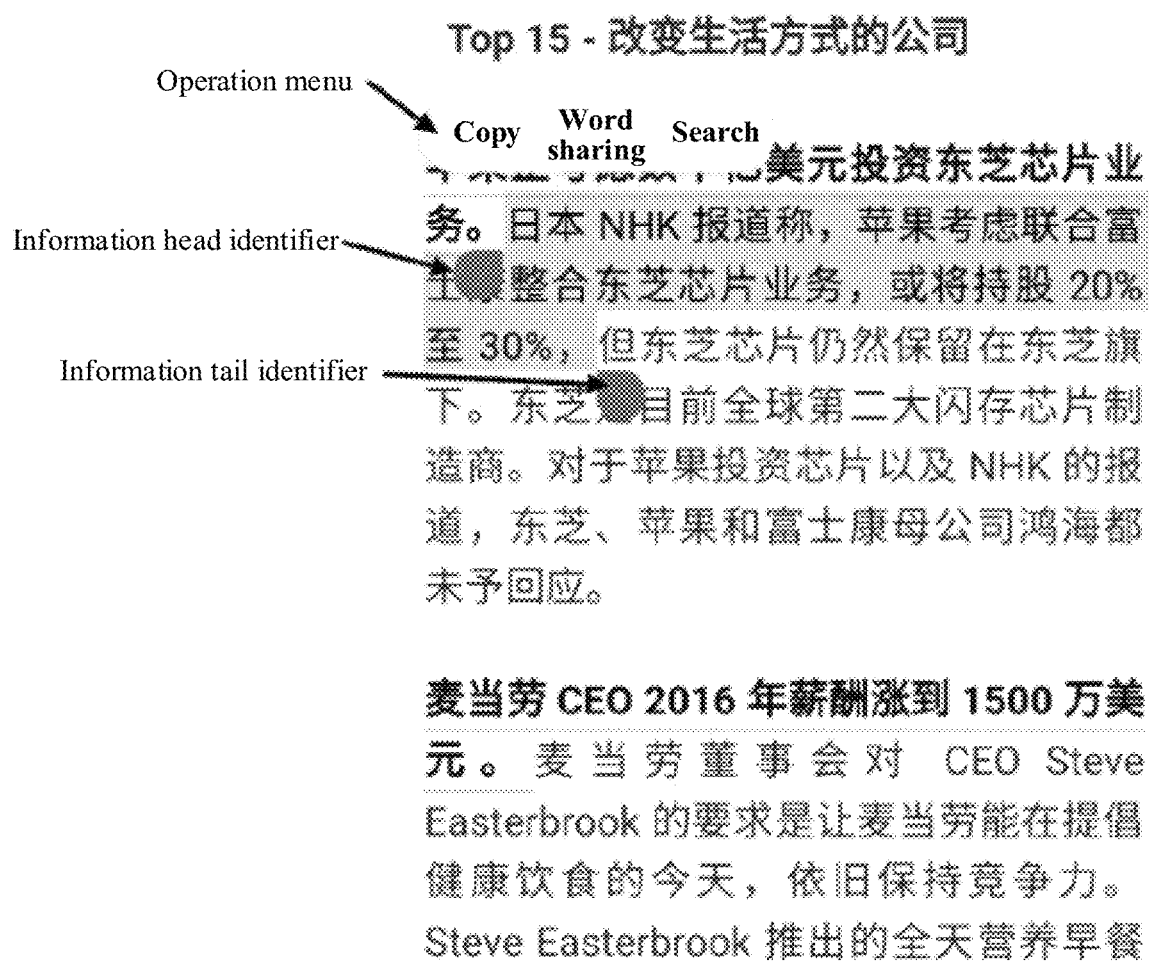
FIG. 1 is a schematic diagram of a copying operation in the prior art.
Figure 2:
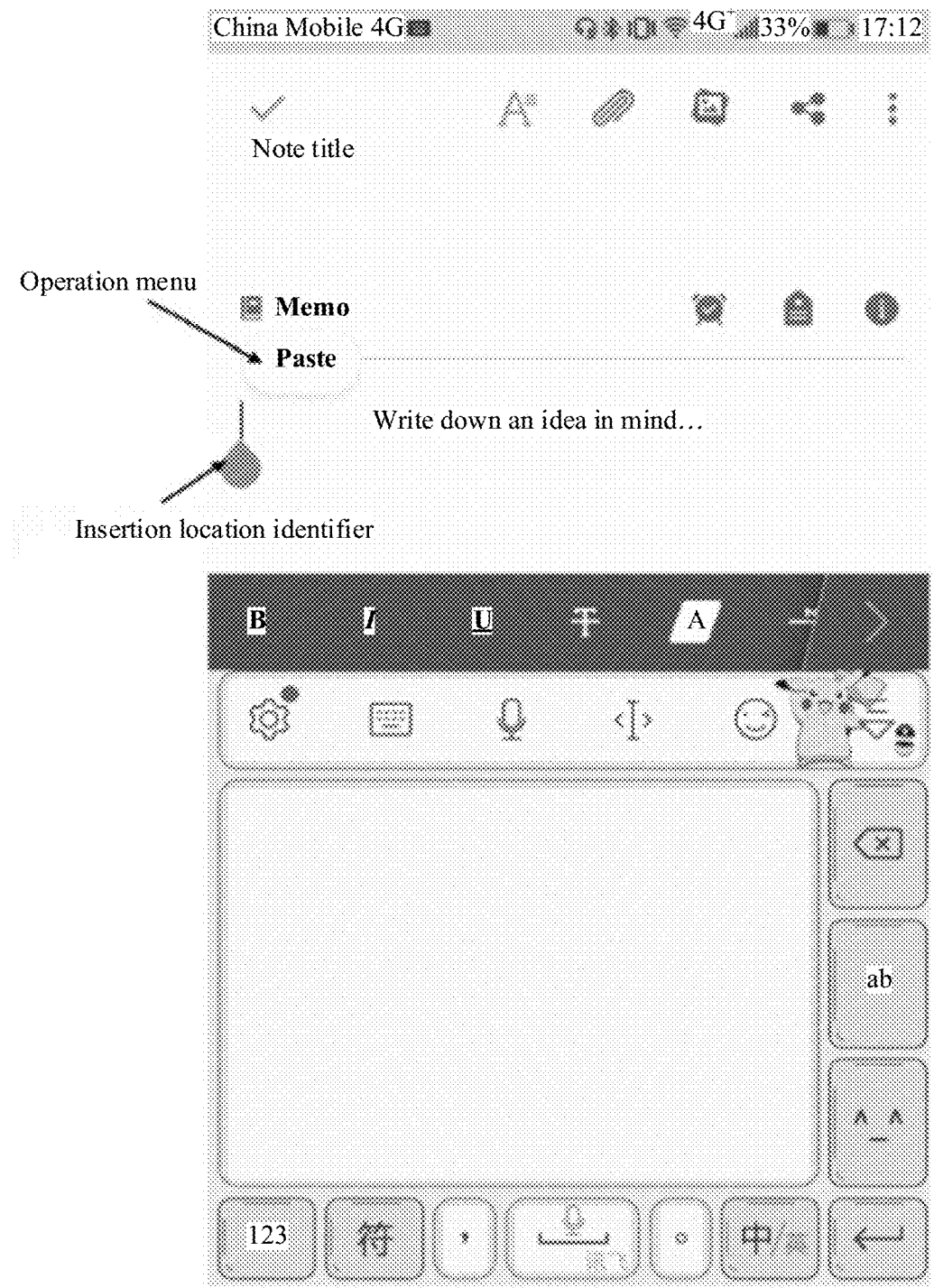
FIG. 2 is a schematic diagram of a pasting operation in the prior art.
Figure 6:
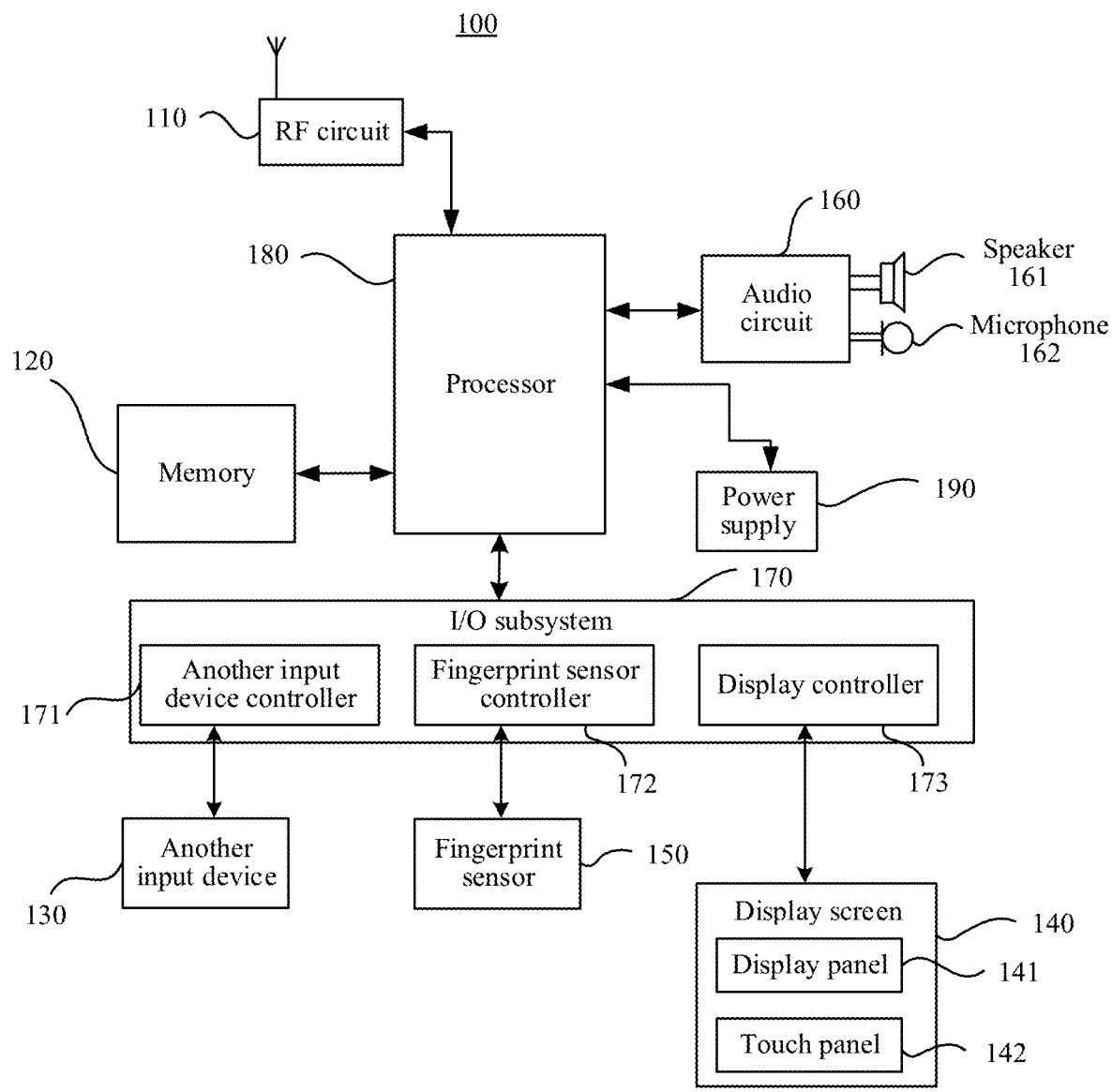
FIG. 6 is a schematic diagram of a mobile phone according to an embodiment of this application.

Using an example in which the user equipment is a mobile phone, FIG. 6 is a block diagram of a partial structure of a mobile phone 100 related to an embodiment of the present invention. Referring to FIG. 6, the mobile phone 100 includes components such as a radio frequency (RF) circuit 110, a memory 120, another input device 130, a display screen 139, a fingerprint sensor 150, an audio circuit 160, an I/O subsystem 170, a processor 180, and a power supply 190. Persons skilled in the art may understand that the structure of the mobile phone shown in FIG. 6 does not constitute a limitation on the mobile phone, and the mobile phone may include more components or fewer components than those shown in the figure, and some components may be combined, some components may be split, or a different component deployment may be used. Persons skilled in the art may understand that the display screen 139 belongs to a user interface (UI), and the mobile phone 100 may include more or fewer user interfaces than those shown in the figure.

The following specifically describes the components of the mobile phone 100 with reference to FIG. 6.

The RF circuit 110 may be configured to receive and send information or receive and send a signal during a call. Particularly, the RF circuit 110 receives downlink information from a base station, then delivers the downlink information to the processor 180 for processing, and additionally sends uplink-related data to the base station. Usually, the RF circuit includes, but is not limited to, an antenna, at least one amplifier, a transceiver, a coupler, a low noise amplifier (LNA), a duplexer, and the like. In addition, the RF circuit 110 may further communicate with a network and another device through wireless communication. The wireless communication may use any communications standard or protocol that includes, but is not limited to, global system for mobile communications (GSM), general packet radio service (GPRS), code division multiple access (CDMA), wideband code division multiple access (WCDMA), long term evolution (LTE), email, short messaging service (SMS), and the like.

The memory 120 may be configured to store a software program and a module. The processor 180 executes various function applications of the mobile phone 100 and performs data processing by running the software program and the module that are stored in the memory 120. The memory 120 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone 100, and the like. In addition, the memory 120 may include a high speed random access memory, and may further include a non-volatile memory such as at least one magnetic disk storage device, a flash memory, or another volatile solid-state storage device.

The another input device 130 may be configured to receive input digit or character information, and generate a key signal input related to user setting and function control of the mobile phone 100. Specifically, the another input device 130 may include, but is not limited to, one or more of a physical keyboard, a functional key (for example, a volume control key or an on/off key), a trackball, a mouse, a joystick, or an optical mouse (the optical mouse is a touch-sensitive surface that does not display a visible output, or an extension of a touch-sensitive surface formed by a touchscreen). The another input device 130 is connected to another input device controller 171 of the I/O subsystem 170, and performs signal exchange with the processor 180 under the control of the another input device controller 171.

The display screen 139 may be configured to display information entered by a user or information provided to a user, and various menus of the mobile phone 100, and may further receive a user input. Specifically, the display screen 139 may include a display panel 141 and a touch panel 142. The display panel 141 may be configured in a form of a liquid crystal display (LCD), an organic light-emitting diode (OLED), or the like. The touch panel 142 is also referred to as a touchscreen, a touch-sensitive screen, or the like, and may collect a contact or non-contact operation of a user on or near the touch panel 142 (such as an operation of a user on or near the touch panel 142 by using any suitable object or accessory such as a finger or a stylus, or a motion sensing operation may be included; and the operation includes a single-point control operation, a multi-point control operation, or another type of operation), and drive a corresponding connected apparatus based on a preset program. Optionally, the touch panel 142 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that can be processed by the processor, and then sends the information to the processor 180, and can receive a command sent by the processor 180 and execute the command. In addition, the touch panel 142 may be a resistive, capacitive, infrared, or surface acoustic wave type touch panel, or the touch panel 142 may be implemented by using any technology of future development. Further, the touch panel 142 may cover the display panel 141. The user may perform, based on content displayed on the display panel 141 (the displayed content includes, but is not limited to, a soft keyboard, a virtual mouse, a virtual key, an icon, and the like), an operation on or near the touch panel 142 covering the display panel 141. After detecting the operation on or near the touch panel 142, the touch panel 142 transfers the operation to the processor 180 through the I/O subsystem 170 to determine the user input. Subsequently, the processor 180 provides a corresponding visual output on the display panel 141 through the I/O subsystem 170 based on the user input. Although, in FIG. 6, the touch panel 142 and the display panel 141 are used as two separate parts to implement input and output functions of the mobile phone 100, in some embodiments, the touch panel 142 and the display panel 141 may be integrated to implement the input and output functions of the mobile phone 100.

The mobile phone 100 may further include at least one fingerprint sensor 150 that can recognize a fingerprint of a finger of the user acting on the fingerprint sensor 150.

A currently common fingerprint sensor separated from a screen may be used as the fingerprint sensor 150. The fingerprint sensor may be placed by opening a hole on a front side or back side of a screen. For example, for a series of mobile phones of Apple Incorporation such as iPhone 6 and iPhone 7, a fingerprint is located on a front side, or for a series of mobile phones of Huawei such as Mate 8 and Mate 9, a fingerprint is located on a back side.

In this application, the fingerprint sensor 150 may also be a touchscreen-integrated fingerprint sensor that recently emerges and is continuously being researched and improved. Different from a conventional capacitive fingerprint sensor for which a hole is opened on a front panel or a back panel of a mobile phone, the touchscreen-integrated fingerprint sensor may complete fingerprint check while a user touches a screen. Full-screen fingerprint recognition may be implemented through the touchscreen-integrated fingerprint sensor. To be specific, regardless of a location on the screen on which a fingerprint is pressed, the fingerprint can be detected.

Specifically, a capacitive fingerprint recognition sensor (for example, a chip) may be placed under the touch panel by drilling a blind via on the back of a front glass cover plate, to implement hidden fingerprint recognition; the fingerprint sensor may be placed under an entire glass panel of the mobile phone; or the fingerprint sensor is integrated into the display screen.

In this application, the display screen usually includes a glass panel, a touch panel, and a display panel from top to bottom, where an area of the touch panel is essentially the same as that of the display panel. In this way, a touch operation may be performed in any display area. The fingerprint recognition sensor may be specifically located under the display panel because a light transmittance of the existing fingerprint recognition sensor usually cannot be made quite high. Therefore, if the fingerprint recognition sensor is placed on the display panel, displaying of the display panel is affected. Certainly, after a technology for the fingerprint recognition sensor is continuously improved subsequently, when displaying of the display panel may be not affected, the fingerprint recognition sensor may be placed on each location on the display panel.

When the fingerprint sensor is disposed under the display panel, a fingerprint detection area of the fingerprint sensor may be set to be not less than a display screen area of the device. In this way, while the user performs a touch operation on any location on the display screen, the fingerprint sensor can detect a fingerprint used for the touch operation.

The touchscreen-integrated fingerprint sensor may operate in an optical manner. For example, a main operating principle of an optical-based fingerprint sensor is to irradiate a finger by using a light source in a mobile phone, and then receive reflected light to recognize a fingerprint. In another embodiment, a sensor having a fingerprint recognition function may be further added to the sensor in a light emitting layer in the display panel of the display screen, to form "interactive pixels". To be specific, fingerprint recognition pixels (including near-infrared transmission and receiving) are added beside each conventional RGB pixel.

In another embodiment, an ultrasonic wave fingerprint sensor may also be integrated into the mobile phone, and a fingerprint of the user may be recognized when a finger points to the ultrasonic wave fingerprint sensor. Implementation of various touchscreen-integrated fingerprint sensors is the prior art, and details are not described in this application.

The audio circuit 160, a speaker 161, and a microphone 162 may provide an audio interface between the user and the mobile phone 100. The audio circuit 160 may convert received audio data into a signal and transmit the signal to the speaker 161. The speaker 161 converts the signal into a sound signal to be output. Further, the microphone 162 converts a collected sound signal into a signal. The audio circuit 160 receives the signal and converts the signal into audio data, and then outputs the audio data to the RF circuit 110 to send the audio data to, for example, another mobile phone, or outputs the audio data to the memory 120 for further processing.

The I/O subsystem 170 is configured to control input and output peripheral devices, and may include the another input device controller 171, a fingerprint sensor controller 172, and a display controller 173. Optionally, one or more another input device controllers 171 receive a signal from the another input device 130 and/or send a signal to the another input device 130. The another input device 130 may include a physical button (a pressing button, a rocker button, or the like), a dial pad, a slider switch, a joystick, a click scroll wheel, or an optical mouse (the optical mouse is a touch-sensitive surface that does not display a visible output, or an extension of a touch-sensitive surface formed by a touchscreen). It should be noted that, the another input device controller 171 may be connected to any one or more of the foregoing devices. The display controller 173 of the I/O subsystem 170 receives a signal from the display screen 139 and/or sends a signal to the display screen 139. After the display screen 139 detects the user input, the display controller 173 converts the detected user input into interaction with a user interface object displayed on the display screen 139. In this way, man-machine interaction is implemented. The sensor controller 172 may receive a signal from one or more fingerprint sensors 150 and/or send a signal to one or more fingerprint sensors 150.

The processor 180 (which may also be considered as an SoC, system-on-a-chip) is a control center of the mobile phone 100, is connected to parts of the entire mobile phone by using various interfaces and lines, and performs various functions of the mobile phone 100 and processes data by running or executing the software program and/or the module stored in the memory 120, invoking data stored in the memory 120, and running software. Optionally, the processor 180 may include one or more processing units. An application processor and a modem processor may be integrated into the processor 180. The application processor mainly processes an operating system, a user interface, an application program, and the like. The modem processor mainly processes wireless communication. It may be understood that the foregoing modem processor may alternatively be not integrated into the processor 180. Common processors are, for example, processors of Qualcomm Snapdragon series and processors of Huawei HiSilicon Kirin series.

Software run on the processor may include a BIOS/EFI program, an operating system, application software, various types of driver software integrated into an operating system or installed through a third party, and the like.

The mobile phone 100 further includes the power supply 190 (such as a battery) supplying power to the components. Preferably, the power supply may be logically connected to the processor 180 through a power management system, to implement functions such as management of charging, discharging, and power consumption through the power management system.

Although not shown, the mobile phone 100 may further include other types of sensors such as an optical sensor, a motion sensor, and another sensor. Specifically, the optical sensor may include an ambient light sensor and a proximity sensor. The ambient light sensor may adjust luminance of the display panel 141 based on brightness of ambient light. The proximity sensor may switch off the display panel 141 and/or backlight when the mobile phone 100 is moved to an ear. As one type of motion sensor, an acceleration sensor may detect magnitude of accelerations in various directions (usually on three axes), may detect magnitude and a direction of gravity when static, and may be applied to a mobile phone posture recognition application (such as switching between a landscape mode and a portrait mode, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone 100. Moreover, the mobile phone 100 may further include a camera, a Bluetooth module, and the like.

The memory may store a plurality of application programs such as a word processing application program, a telephone application program, an email application program, an instant messaging application program, a photograph management application program, a network browsing application program, a digital music player application program and/or a digital video player application program, and the like.

By invoking the program stored in the memory 120, the processor 180 may perform a method according to each embodiment of this application.

Figure 7:
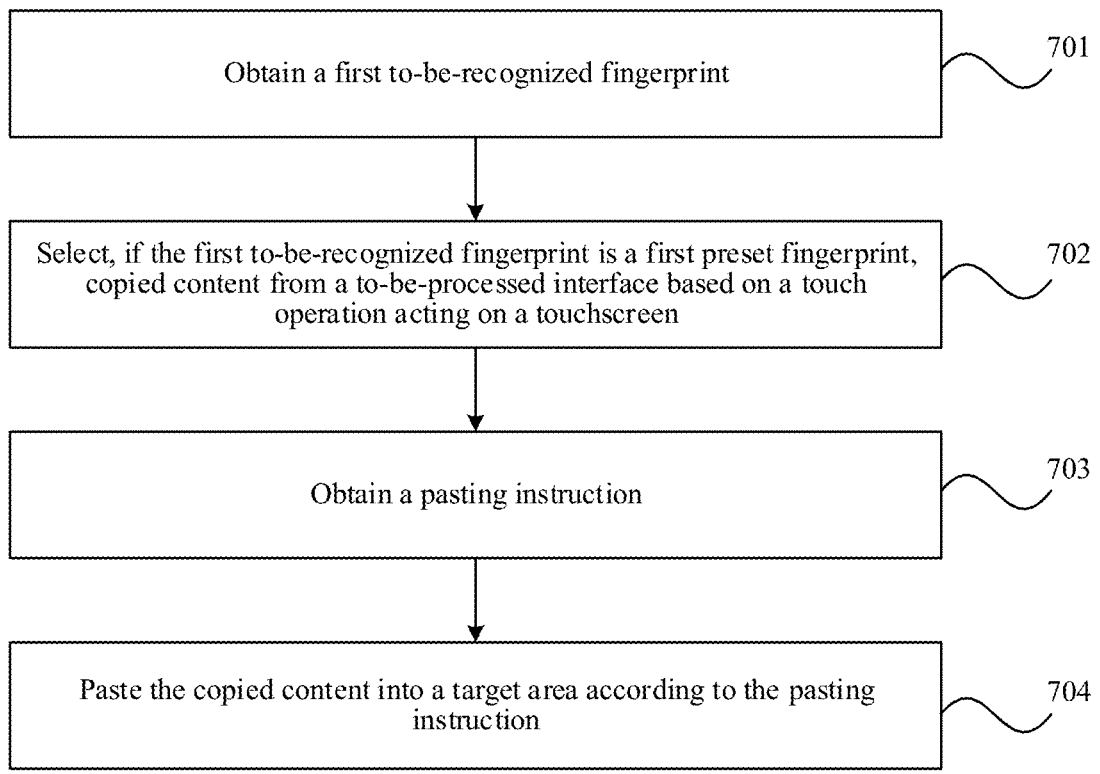
FIG. 7 is a schematic diagram of a copying and pasting method according to an embodiment of this application.

Referring to FIG. 7, an embodiment of a copying and pasting method provided in this application includes the following steps.

Step 701. Obtain a first to-be-recognized fingerprint.

In an embodiment, user equipment is equipped with a full-screen fingerprint sensor, and the fingerprint sensor may detect a fingerprint acting on any point on a touchscreen.

In an optional embodiment, step 701 is specifically: obtaining, by using a fingerprint sensor when a touch operation acting on the touchscreen is detected, a fingerprint used for the touch operation; and using the fingerprint used for the touch operation as the first to-be-recognized fingerprint. Specifically, when the fingerprint sensor is a capacitive fingerprint sensor, in a process of performing a touch operation on the touchscreen, for example, when a finger begins to be in contact with the touchscreen, a finger slides on the touchscreen, or a finger stops sliding, the capacitive fingerprint sensor may detect a fingerprint used for the touch operation. When the fingerprint sensor is an optical fingerprint sensor, the optical fingerprint sensor may obtain an image of a fingerprint through optical scanning, and then output the image to a processor. When the fingerprint sensor is an ultrasonic wave sensor, a fingerprint may be detected in an ultrasonic wave manner.

It should be noted that, in this application, unless particularly stated, when "first" and "second" are used as modifiers (for example, a first to-be-recognized fingerprint), "first" and "second" are used to only differentiate between different modified terms, but do not represent other special meanings.

Popularly speaking, "first" and "second" are equivalent to statements such as "a" and "another".

In another optional embodiment, step 701 is specifically: detecting a touch operation acting on the touchscreen; awakening a fingerprint sensor when an operation area of the touch operation is an interface of a preset application program run on a foreground (or in other words, "when an operation area of the touch operation corresponds to an interface of a preset application program run on a foreground". To be specific, visually speaking, a user operates an interface of an application program run on the foreground. For example, the user taps some controls such as a button and a scroll bar, flips a page through sliding, or invokes a menu through touch and hold. Certainly, persons skilled in the art may understand that, actually, the user does not "directly" operate the interface. The user directly operates only the screen, and various types of software and hardware subsequently perform processing to visually present an effect of operating, by the user, the interface of the application program. Specific implementation thereof is the prior art, and details are not described in this application); and obtaining, by using the fingerprint sensor, a fingerprint used for the touch operation, and using the fingerprint used for the touch operation as the first to-be-recognized fingerprint. The preset application program may be an application program having a copyable object, for example, a document application such as Word or WPS, an SMS message, or a web page. A copying function is triggered only when the preset application program is run on the foreground and the user touches the interface of this preset application program. In this way, trigger of the copying function can be prevented when the user runs some applications (for example, playing a game, watching a video, or watching a picture) on which trigger of the copying function is not desired, thereby reducing misoperations, and use of excessive resources can also be prevented, thereby reducing power consumption.

In another embodiment, even if a finger is not in contact with the screen, fingerprint detection may be triggered (for example, detection is performed in an ultrasonic wave manner, an optical manner, or another manner). For example, when the fingerprint sensor is an ultrasonic wave sensor, the ultrasonic wave fingerprint sensor emits an ultrasonic wave. If a finger of a user points to the touchscreen, and a distance between the finger and the touchscreen falls within a detection range of the ultrasonic wave fingerprint sensor, even if the finger does not touch the touchscreen, the ultrasonic wave fingerprint sensor can perform multi-point scanning on the finger, to detect fingerprint-related information (for example, a distance from the fingerprint to the fingerprint sensor) and output the fingerprint-related information to a processor, so that the processor generates an image of the fingerprint.

In this application, the fingerprint sensor may also be in an operating state all the time, and when a finger is in contact with the screen, the fingerprint sensor may immediately detect a fingerprint. If the fingerprint sensor is in an operating state all the time, a detected fingerprint may be sent in real time to the processor for processing; or only when a finger touches the screen, the fingerprint sensor senses and sends a detected fingerprint to the processor for processing, to avoid a large amount of useless interaction, save resources, and reduce power consumption.

Step 702. Select, if the first to-be-recognized fingerprint is a first preset fingerprint, copied content from a to-be-processed interface based on a touch operation acting on a touchscreen.

Figure 8:
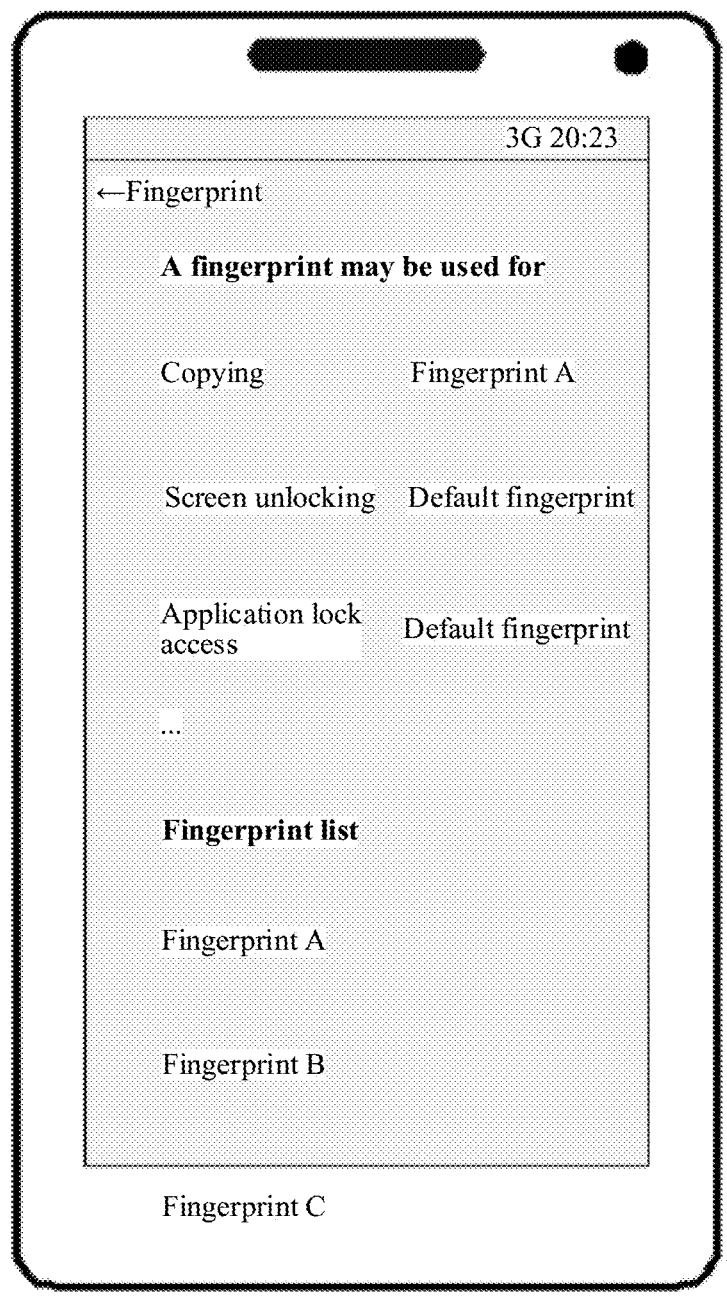
FIG. 8 is a schematic diagram of a correspondence between a fingerprint and a function according to an embodiment of this application.

For details, refer to FIG. 8. FIG. 8 is a schematic diagram of a correspondence between a fingerprint and a function. A user may pre-store a fingerprint A, a fingerprint B, a fingerprint C, and the like in user equipment. The fingerprint A corresponds to a copying function, and the fingerprint A may be specifically a fingerprint of any finger. A fingerprint corresponding to each of copying, screen unlocking, and application lock access may be set in a user-defined manner.

A touch operation acting on the touchscreen may be detected through the touchscreen, and the processor selects content from the to-be-processed interface based on the touch operation acting on the touchscreen. If the first to-be-recognized fingerprint is the first preset fingerprint, the selected content is stored into a memory (for example, internal memory) as the copied content. To be specific, the "selecting the copied content" includes a process of "selecting content" and a process of storing "the selected content" into the memory as the copied content.

It may be understood that, a fingerprint of any one or more fingers may be used as the first preset fingerprint. To be not confused with an operation (for example, tapping) of a finger that is usually used frequently (for example, an index finger), a fingerprint of a finger that is usually used infrequently (for example, a middle finger or a ring finger) may be used. If the first to-be-recognized fingerprint is not the first preset fingerprint, content may be selected based on the touch operation, but the selected content is not used as copied content. How to select, based on a touch operation, content as copied content is the prior art, and details are not described in this application. Moreover, it may be understood that, this process is automatically performed by a user terminal, and does not require participation of the user, while a conventional copying manner requires that after selecting content, a user tap a "copying" option in a popped-up menu. Therefore, the operation in this application can increase a copying speed.

Step 703. Obtain a pasting instruction.

When a location selected by the touch operation belongs to a pastable area, and it is detected that an object satisfies a pasting condition, the user equipment obtains the pasting instruction, where the detected object may be a touch operation, a touch time length, or a fingerprint. For example, during touch and hold, a menu including a "pasting" option is displayed through cooperation between software and hardware of the user equipment, and when the user taps "pasting", a "pasting" instruction is generated inside software, is obtained subsequently by another software module, and is correspondingly processed (for example, step 704 is performed).

Step 704. Paste the copied content into a target area according to the pasting instruction.

The target area is a pastable area, that is, an area in which the copied content may be "pasted", and a "pasting" form may be, but is not limited to, based on various existing pasting manners, for example, pasting by performing matching between source and target formats, pasting performed in an attachment form, and pasting performed in a word/picture form. Specifically, the pastable area may be an area in which information may be input, for example, a text input area, an image editing area, or a multimedia insertion area.

In this embodiment, if the obtained first to-be-recognized fingerprint is the first preset fingerprint, the copied content may be selected from the to-be-processed interface based on the touch operation acting on the touchscreen; and after the pasting instruction is obtained, the copied content is pasted into the target area according to the pasting instruction. Based on this application, the copying function may be directly triggered through a fingerprint, the operation menu does not need to be invoked, and the function option of "copying" does not need to be selected either. Therefore, it can be learned that, based on this application, the operation steps during copying and pasting are reduced, and the copying and pasting efficiency can be improved.

Based on the foregoing embodiments, during actual application, this application provides a plurality of methods for selecting copied content. For details, refer to the following embodiments.

In an optional embodiment, the selecting copied content from a to-be-processed interface based on a touch operation acting on a touchscreen specifically includes: selecting the copied content from the to-be-processed interface based on a touch track of the touch operation on the touchscreen.

In this embodiment, when the touch operation is a slide operation, the user equipment may detect a touch track of the slide operation on the touchscreen, select content based on the touch track, and use the selected content as the copied content. Using an example in which a touch object is a finger below, a method for selecting content based on a touch track is described in detail. Refer to the following embodiments.

Further, optionally, the selecting the copied content from the to-be-processed interface based on a touch track of the touch operation on the touchscreen includes: using text information as the copied content when content corresponding to the touch track includes the text information.

Figure 9:
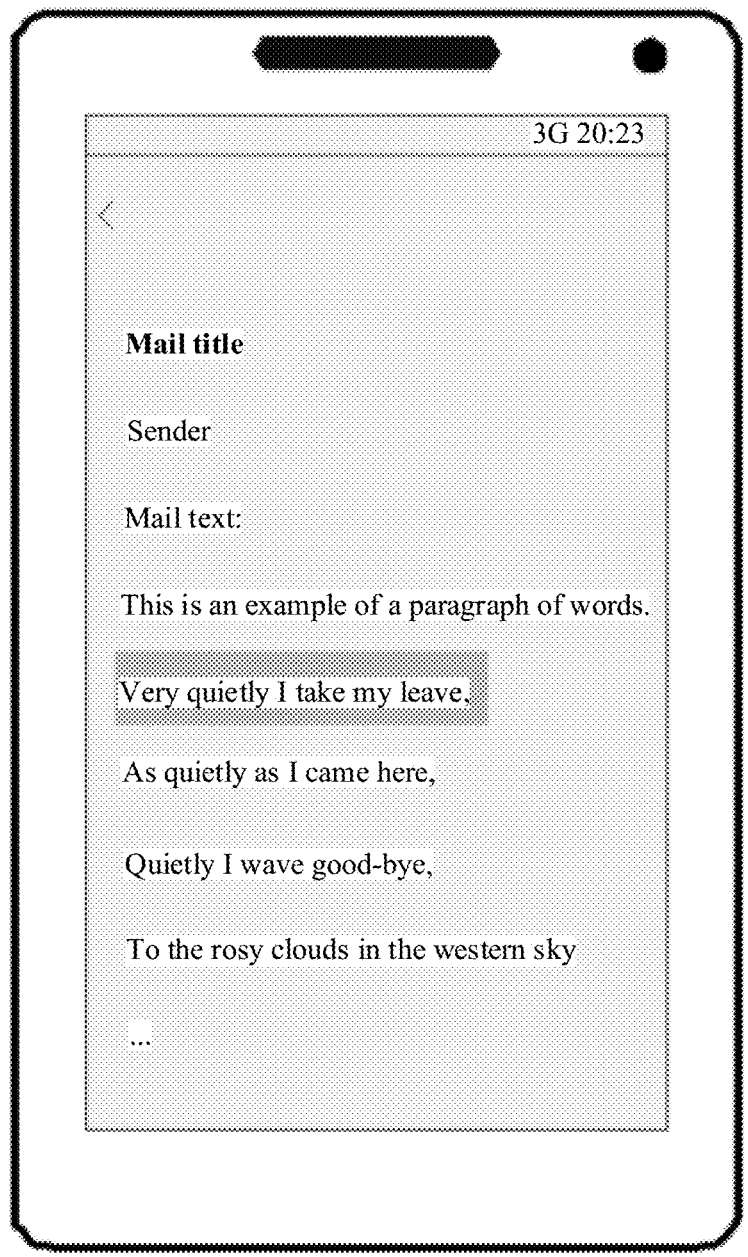
FIG. 9 is a schematic diagram of copying content on a mail interface according to an embodiment of this application.
Figure 10:
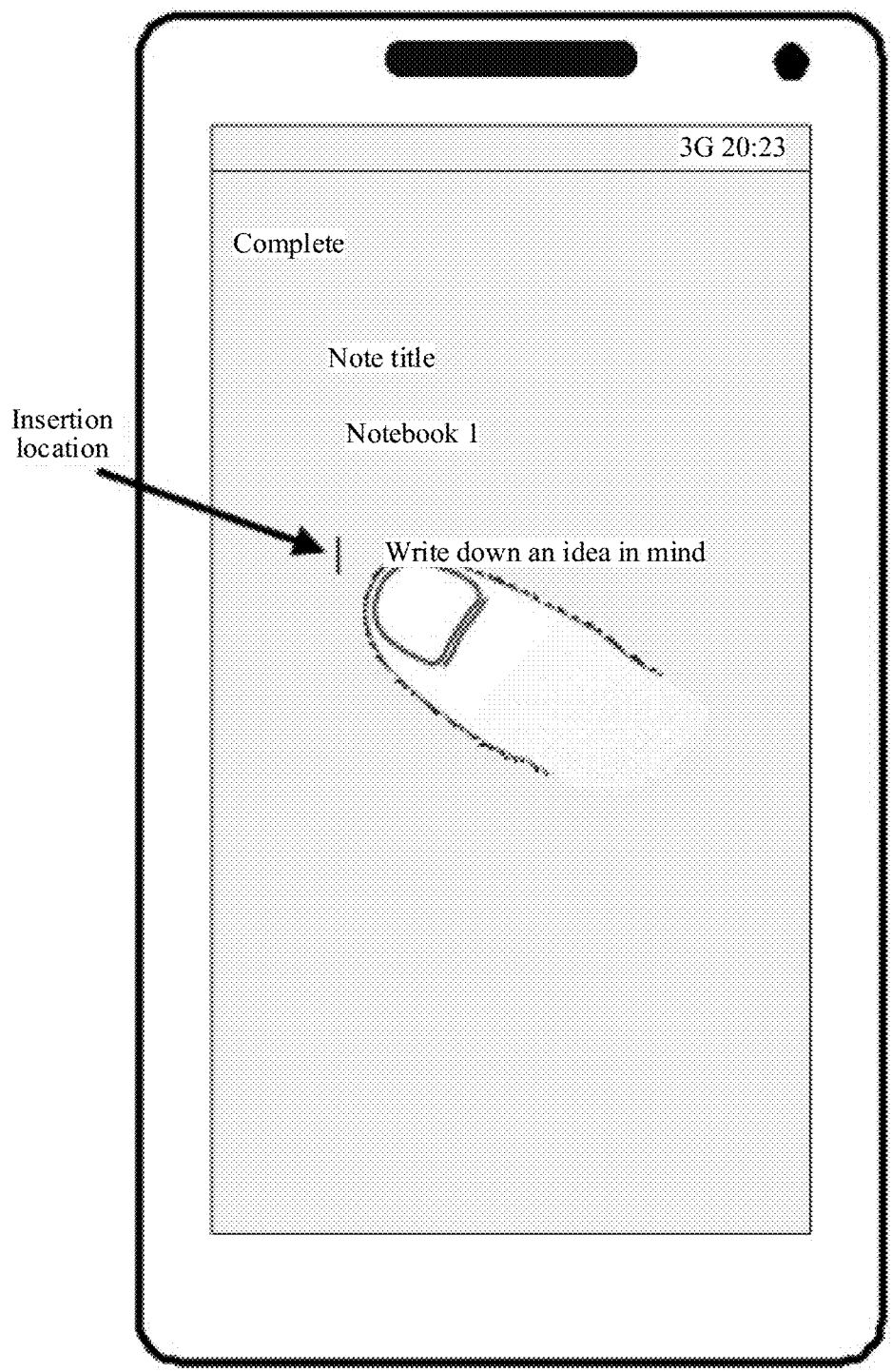
FIG. 10 is a schematic diagram of a target area according to an embodiment of this application.
Figure 11:
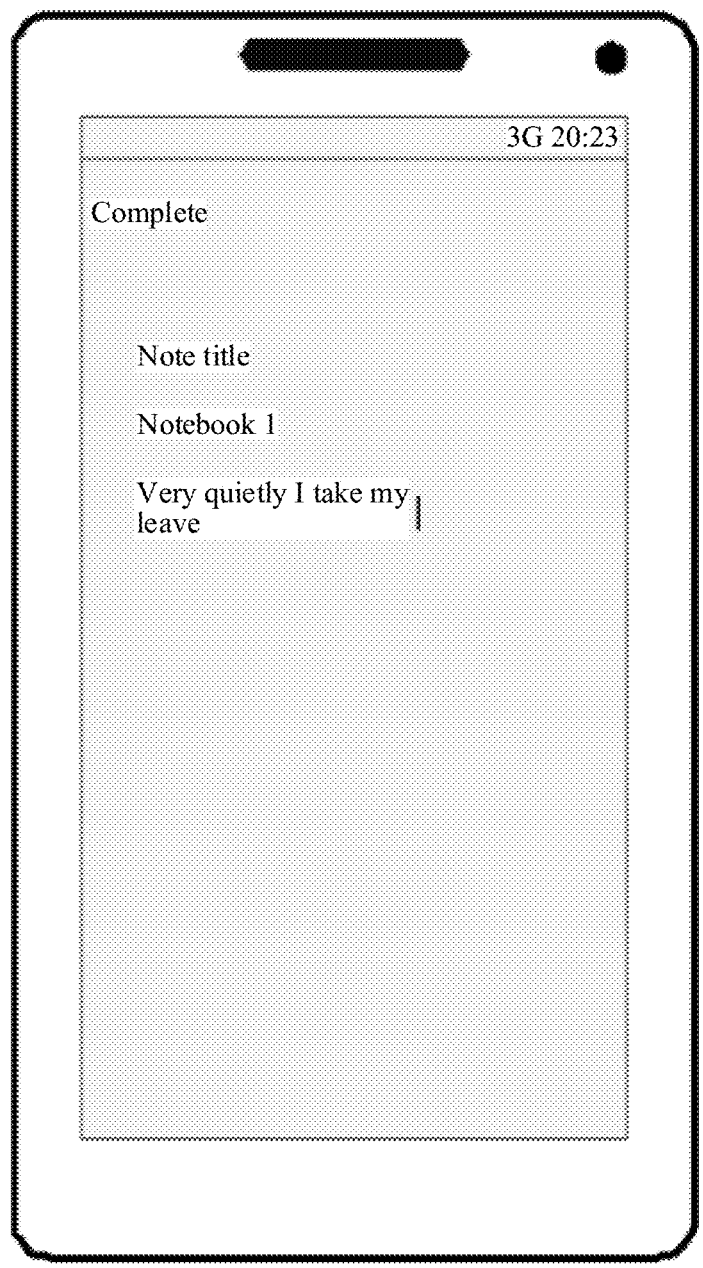
FIG. 11 is a schematic diagram of pasting content into a target area according to an embodiment of this application.

Specifically, the to-be-processed interface may be an application interface including a text, a picture, or multimedia information, for example, a document, a web page, a mail, an agenda, or a notepad. FIG. 9 is a schematic diagram of copying content on a mail interface. If a first preset fingerprint is a fingerprint A, when a finger slides on a touchscreen and a fingerprint of the finger used for the slide operation is the fingerprint A, user equipment may determine that words corresponding to a slide track are "Very quietly I take my leave", use "Very quietly I take my leave" as copied content, and store the text in a memory 120 (for example, internal memory) in a character string form. Moreover, "Very quietly I take my leave" is displayed to be in a selected state. During pasting, refer to FIG. 10. FIG. 10 is a schematic diagram of a notebook application program. When it is detected that the user taps a text input area in the notebook application program by using a fingerprint A, the user equipment may determine that an area corresponding to the tapping operation is a pastable area and that a fingerprint used for the tapping operation is the first preset fingerprint, and the user equipment reads the stored character string "As quietly as I came here" from the memory 120, and loads the character string to an insertion location in the text input area, and a display effect generated after pasting is completed is shown in FIG. 11. Optionally, when a finger slides from left to right, selected content may be increased in an order from left to right; or when a finger slides from right to left, selected content may be canceled in an order from right to left.

Further, optionally, the selecting the copied content from the to-be-processed interface based on a touch track of the touch operation on the touchscreen includes: displaying, when content corresponding to the touch track includes text information, an option of converting a text into a picture; and converting the text information into a picture when the option of converting a text into a picture is selected, and using the picture as the copied content.

Figure 12:
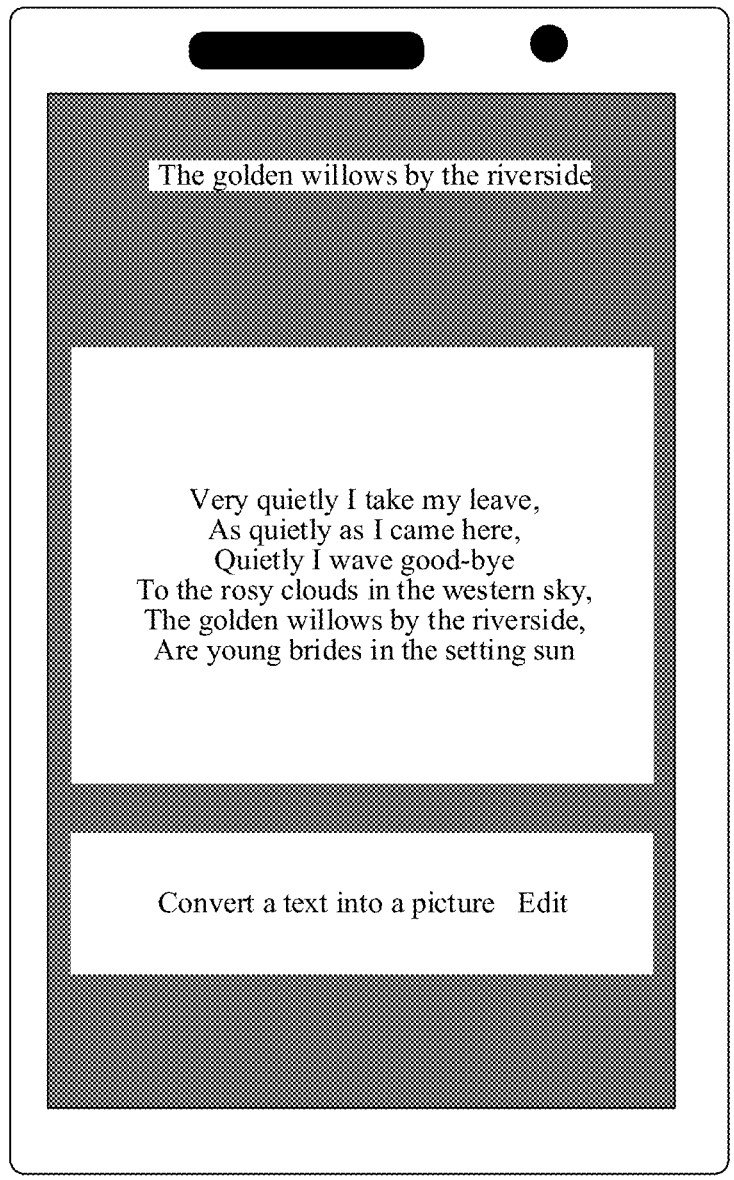
FIG. 12 is another schematic diagram of a copying operation according to an embodiment of this application.

Specifically, referring to FIG. 12, after a finger slides to select "As quietly as I came here . . . sun", user equipment may display an area including the foregoing words, and display an option of converting a text into a picture. When a finger taps the option of "converting a text into a picture", the user equipment determines that the option of "converting a text into a picture" is selected, converts the selected "As quietly as I came here" into a picture, and uses the picture as copied content. An operation menu provided by the user equipment may further include options such as "editing" and "sharing".

Further, optionally, the selecting the copied content from the to-be-processed interface based on a touch track of the touch operation on the touchscreen includes: using, when the touch track forms a closed area and the closed area includes a picture, the picture in the closed area as the copied content.

Figure 13:
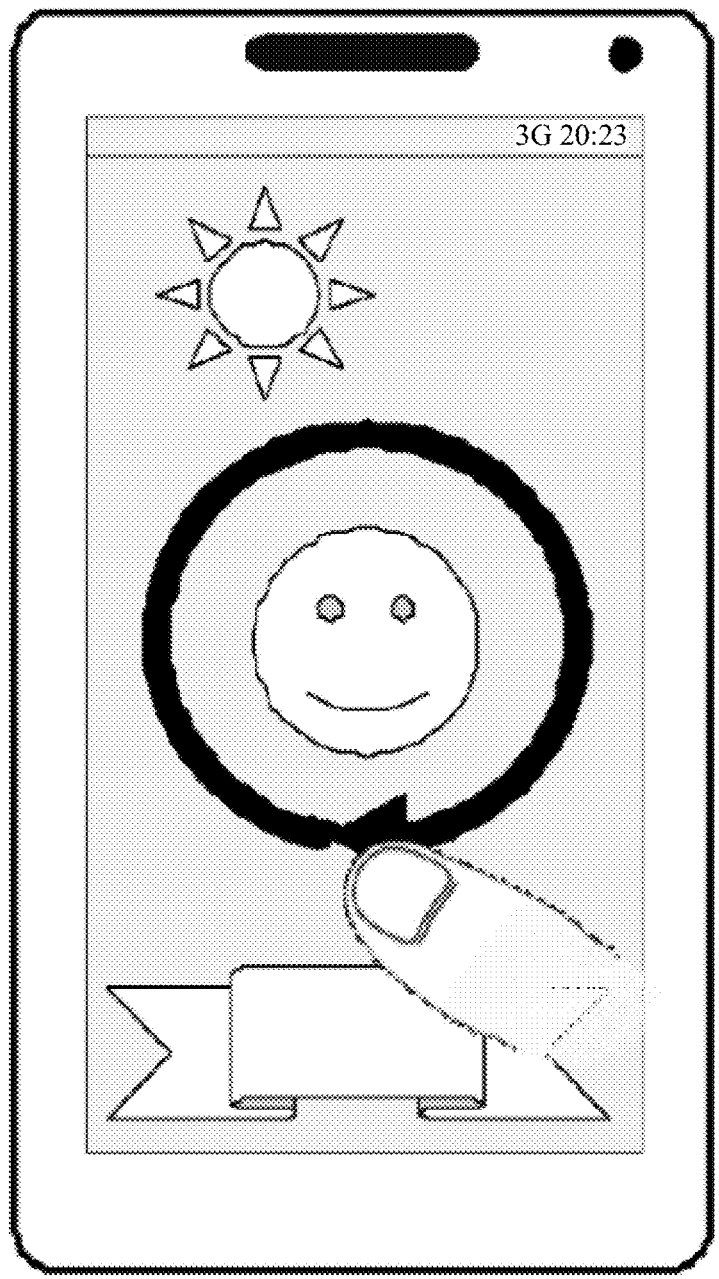
FIG. 13 is a schematic diagram of selecting a picture in a closed area as copied content according to an embodiment of this application.
Figure 14:
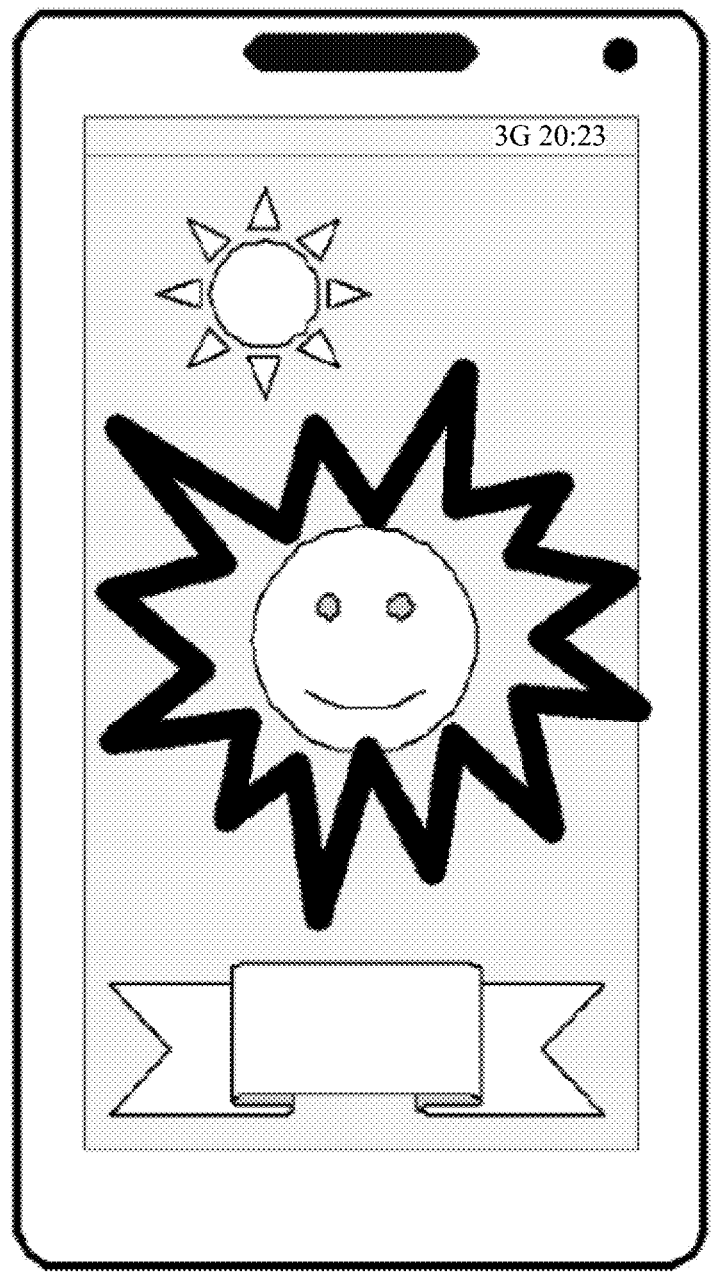
FIG. 14 is another schematic diagram of selecting a picture in a closed area as copied content according to an embodiment of this application.
Figure 15:
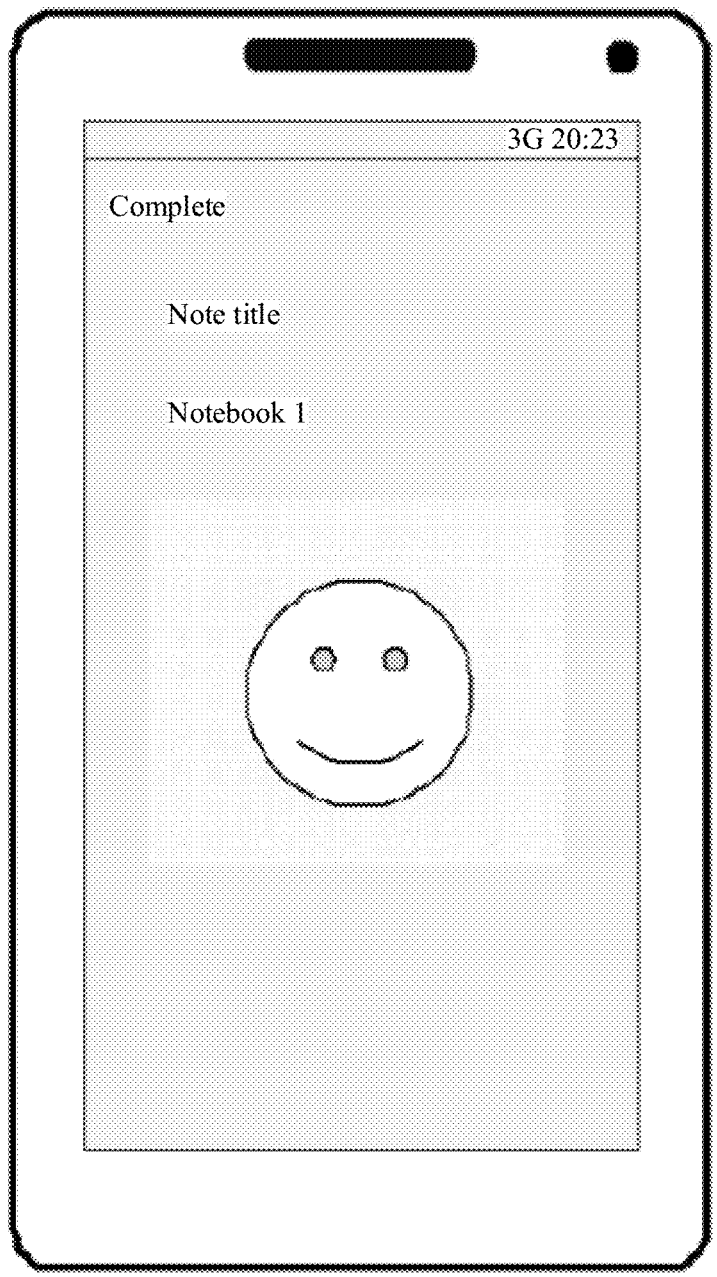
FIG. 15 is another schematic diagram of pasting content into a target area according to an embodiment of this application.

For details, refer to FIG. 13 and FIG. 14. FIG. 13 and FIG. 14 are schematic diagrams of selecting a picture in a closed area as copied content. In FIG. 13, a touch track of a finger on a touchscreen is a circle, and a selected pattern is a smiling face pattern. In FIG. 14, a touch track of a finger on a touchscreen is a closed area in an irregular shape, and a selected pattern is a smiling face pattern. When a touch operation acts on a pastable area, a selected pattern is pasted into a target area, as shown in FIG. 15.

Additionally, a pattern corresponding to an entire closed area may alternatively be used as copied content. When the closed area includes word information, an option of "converting a text into a picture" may be displayed. When a finger taps the option of "converting a text into a picture", user equipment determines that the option of "converting a text into a picture" is selected, converts a word or a symbol in the closed area into a picture, and uses the picture as copied content. Alternatively, text information included in the closed area may be used as copied content.

In another optional embodiment, the selecting copied content from a to-be-processed interface based on a touch operation acting on a touchscreen includes: determining a touch location of the touch operation on the touchscreen; and using, when content corresponding to the touch location is a thumbnail, an original picture corresponding to the thumbnail as the copied content.

Figure 16:
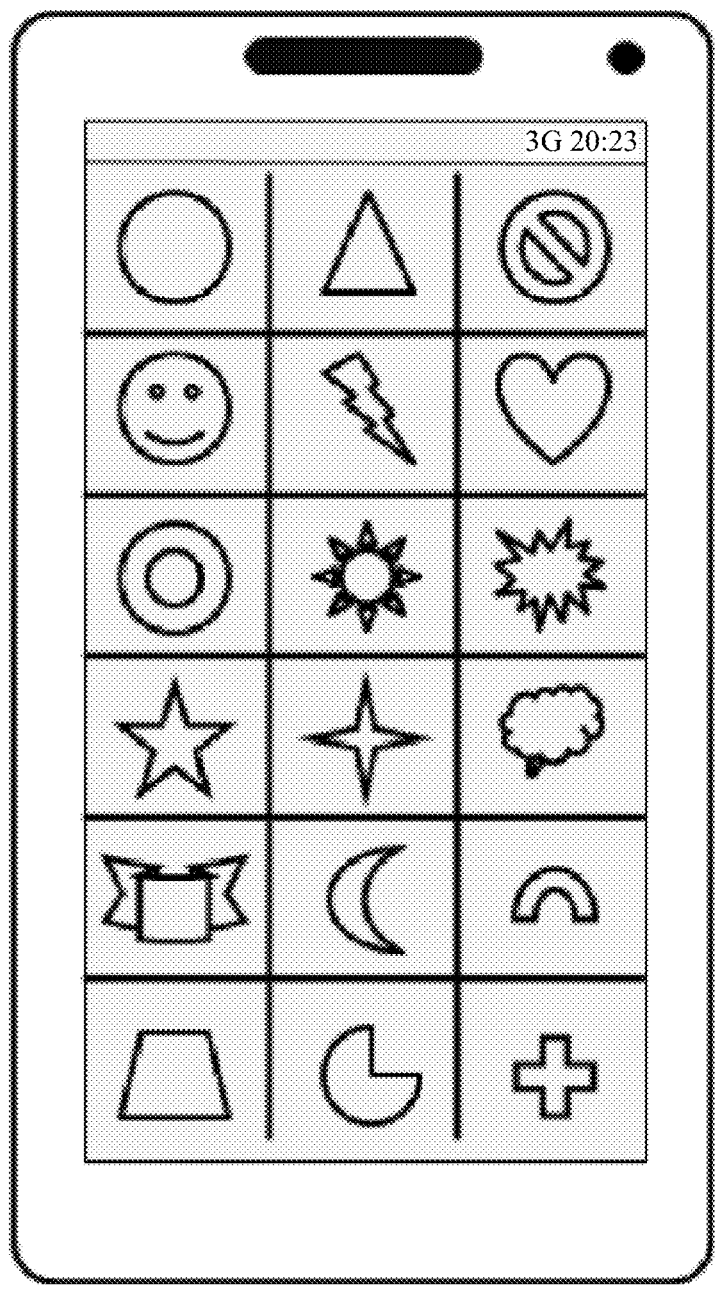
FIG. 16 is a schematic diagram of a plurality of thumbnails according to an embodiment of this application.

For details, refer to FIG. 16. FIG. 16 is a schematic diagram of a plurality of thumbnails. The interface includes thumbnails of images such as a smiling face, a heart, and a dual ring. When a finger taps a thumbnail of an object that is a smiling face pattern, user equipment may use an original picture corresponding to the thumbnail as copied content, and paste the original picture of the smiling face pattern into an information input area when the copied content is pasted in a notebook application, as shown in FIG. 15. The user equipment may alternatively use the thumbnail as the copied content. Additionally, when a tapped object is a dynamic picture, the user equipment may alternatively use the dynamic picture as the copied content.

In another optional embodiment, the selecting copied content from a to-be-processed interface based on a touch operation acting on a touchscreen includes: determining a touch location of the touch operation on the touchscreen; and using, when content corresponding to the touch location is a multimedia file, the multimedia file as the copied content.

Specifically, when an object tapped by a finger is a multimedia file (for example, a video file or an audio file), the user equipment may determine that content corresponding to the touch operation is a video file or an audio file, and use the selected video file or audio file as the copied content.

In another optional embodiment, the selecting copied content from a to-be-processed interface based on a touch operation acting on a touchscreen includes: determining a touch location of the touch operation on the touchscreen; and using, when content corresponding to the touch location is a contact card, the contact card as the copied content.

Figure 17:
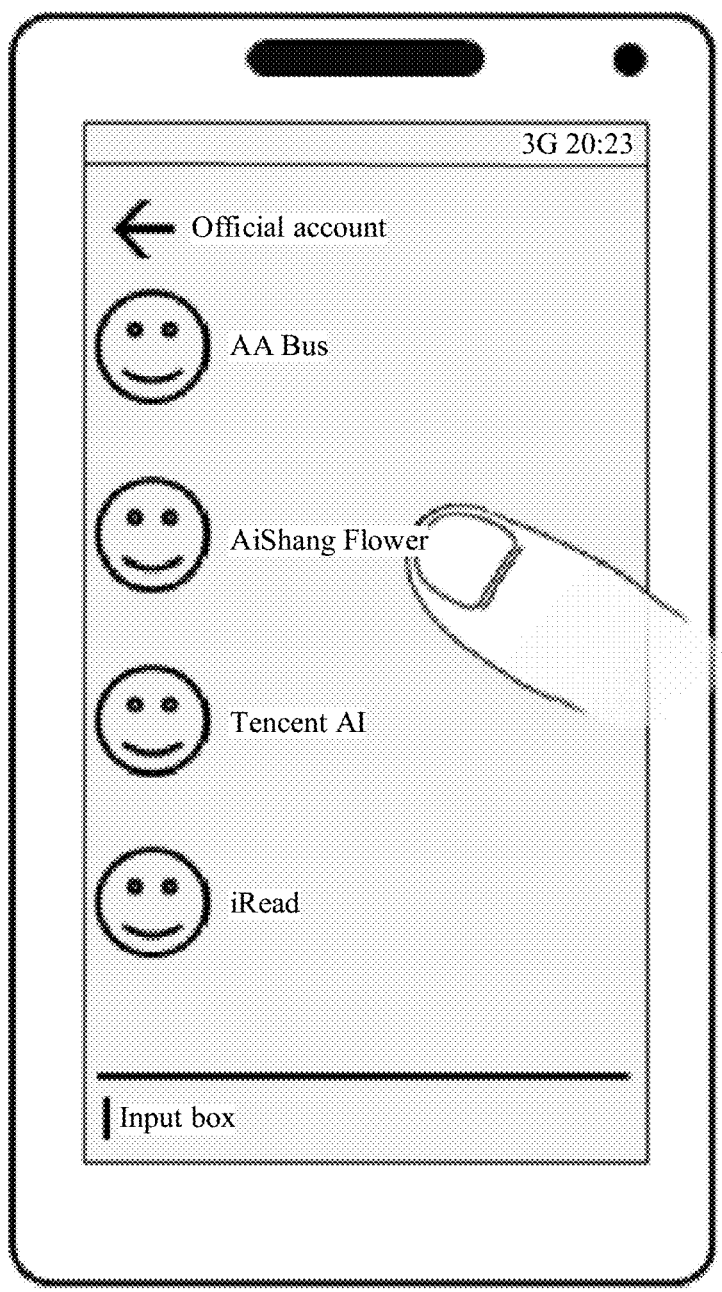
FIG. 17 is a schematic diagram of copying a contact card according to an embodiment of this application.
Figure 18:
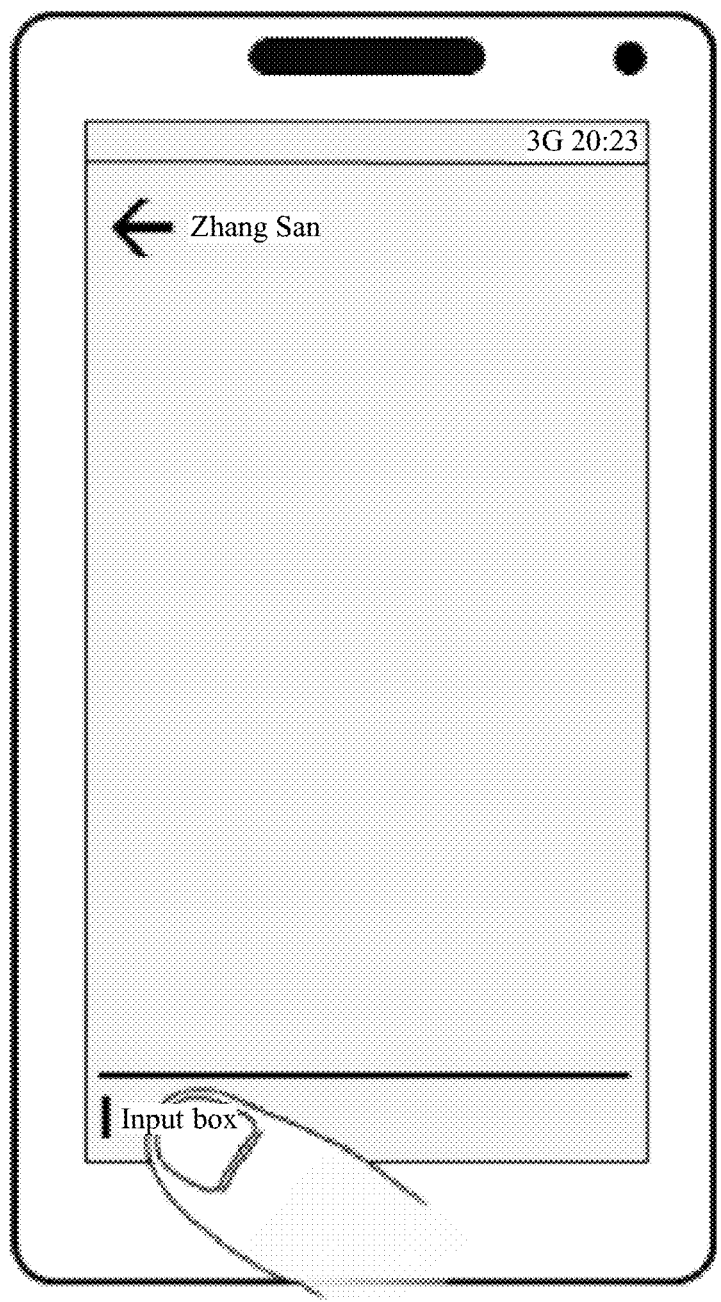
FIG. 18 is another schematic diagram of a target area according to an embodiment of this application.
Figure 19:
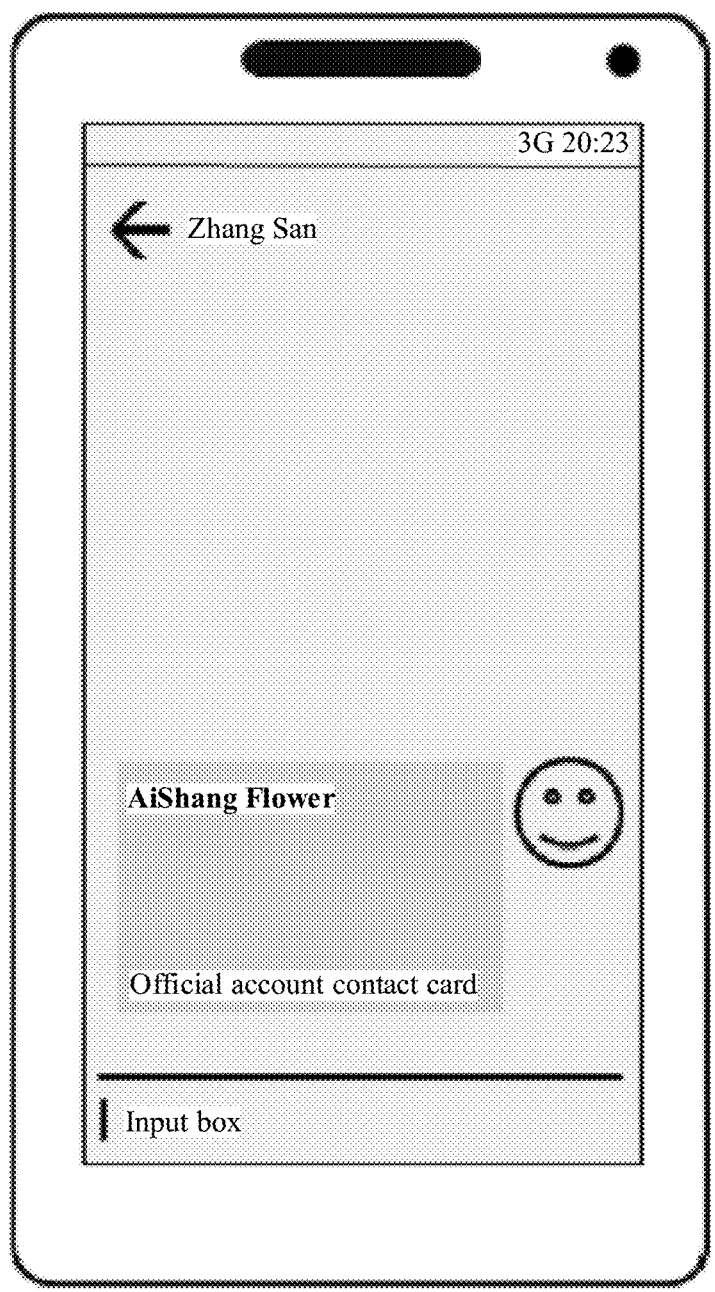
FIG. 19 is a schematic diagram of pasting a contact card into a target area according to an embodiment of this application.

Specifically, when a finger taps the contact card, or a finger taps a part of the contact card, the user equipment may determine that content corresponding to the touch operation is a contact card, and use the contact card as the copied content. For example, FIG. 17 to FIG. 19 are schematic diagrams of copying and pasting a contact card. FIG. 17 is a schematic diagram of a plurality of official account contact cards. An application interface shown in FIG. 17 includes a plurality of contact cards such as AA Bus, AiShang Flower, Tencent AI, and iRead. When "AiShang Flower" is tapped, the user equipment uses a contact card of "AiShang Flower" as copied content. When switching to a dialog input box of a chat interface, as shown in FIG. 18, the user equipment sends the contact card of "AiShang Flower" to a message receiving party (that is, Zhang San), as shown in FIG. 19.

Further, optionally, step 703 includes: detecting, after the touch operation ends, one more touch operation acting on the target area; displaying, when a time length for which the one more touch operation has been in contact with the touchscreen reaches a preset time length, an operation menu including a pasting option; and obtaining the pasting instruction when the pasting option is selected. In this way, the copying function may be implemented by using a fingerprint, and the pasting function may be implemented without using a fingerprint.

Further, optionally, step 703 includes: detecting, after the touch operation ends, one more touch operation acting on the touchscreen; and obtaining the pasting instruction when a fingerprint used for the one more touch operation is a second preset fingerprint. Pasting is completed subsequently according to the pasting instruction, and "the second preset fingerprint" may be referred to as a pasting fingerprint used for a pasting operation. In this embodiment, the first preset fingerprint corresponding to the copying operation may be the same as the second preset fingerprint corresponding to the pasting operation. For example, the user performs a touch operation through an index finger, and performs one more touch operation through the index finger, and the user equipment may determine that the touch operation is the copying operation, and determine that the one more touch operation is the pasting operation. Alternatively, the first preset fingerprint corresponding to the copying operation may be different from the second preset fingerprint corresponding to the pasting operation. For example, a touch operation corresponding to an index finger is the copying operation, and a touch operation corresponding to a middle finger is the pasting operation.

Further, optionally, step 704 includes: using a touch location of one more touch operation on the touchscreen as one more touch location; and pasting, according to the pasting instruction, the copied content after content corresponding to the one more touch location. Specifically, after a finger selects a target location (for example, a location of a cursor displayed on a UI interface) in the target area, the user equipment reads copied content from the memory 120, and displays the copied content starting from the target location in the target area. Optionally, the user equipment may paste the copied content to beginning of a line of the selected location.

Figure 20:
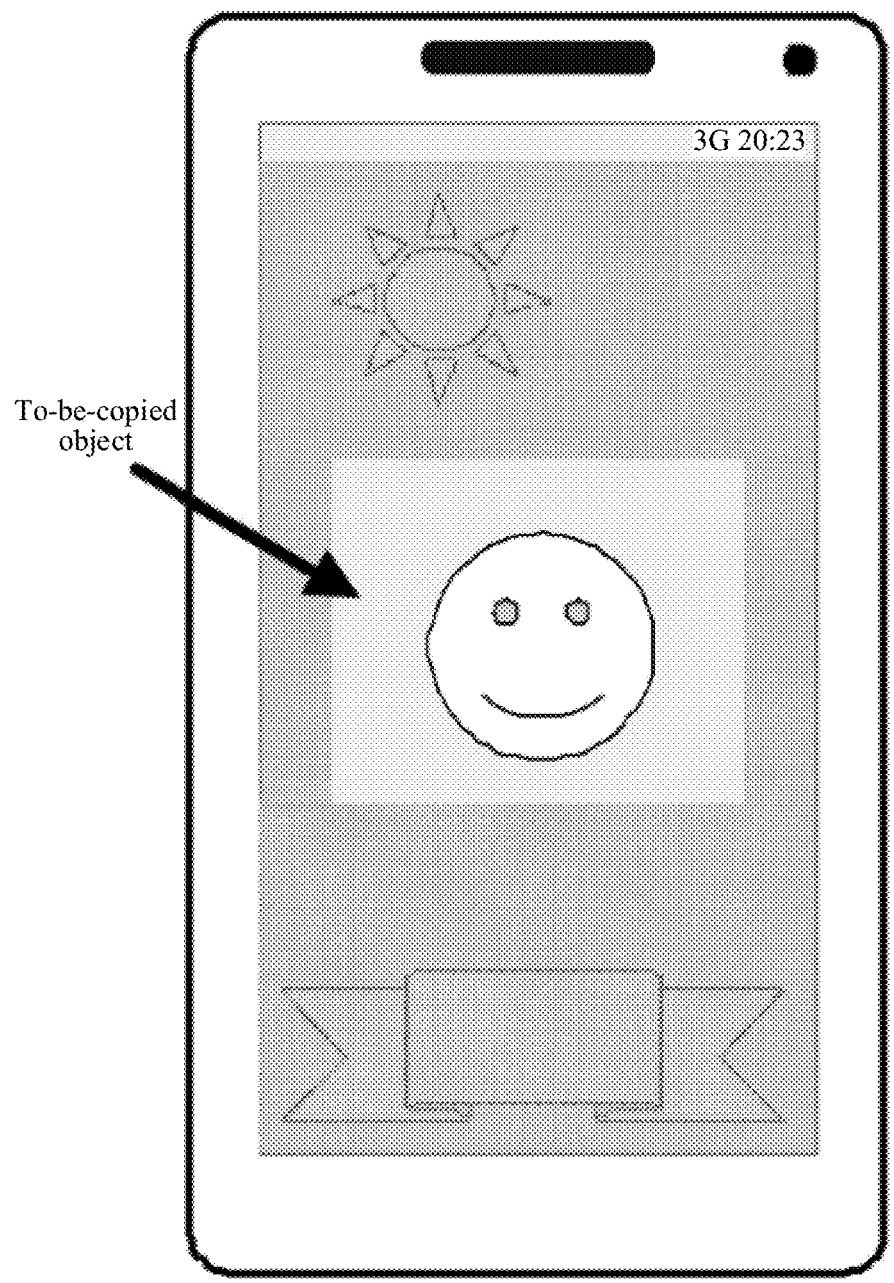
FIG. 20 is a schematic diagram of copying a pattern according to an embodiment of this application.
Figure 21:
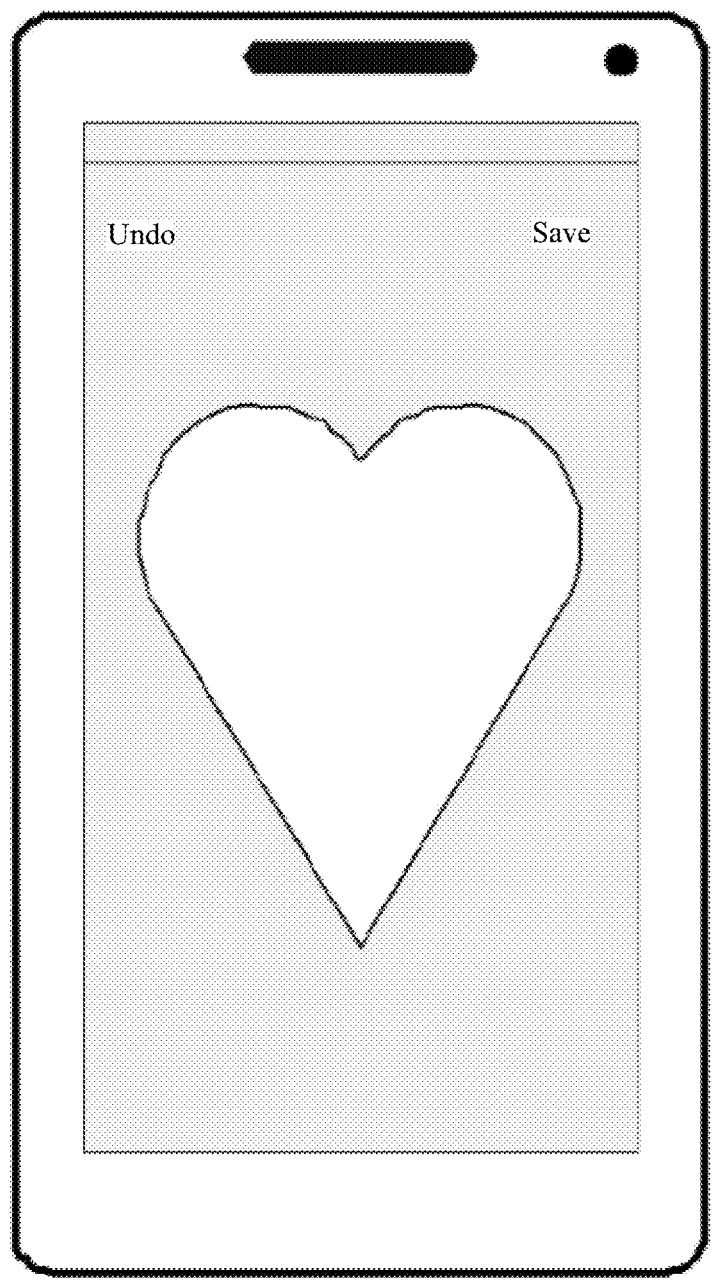
FIG. 21 is a schematic diagram of an image editing interface according to an embodiment of this application.
Figure 22:
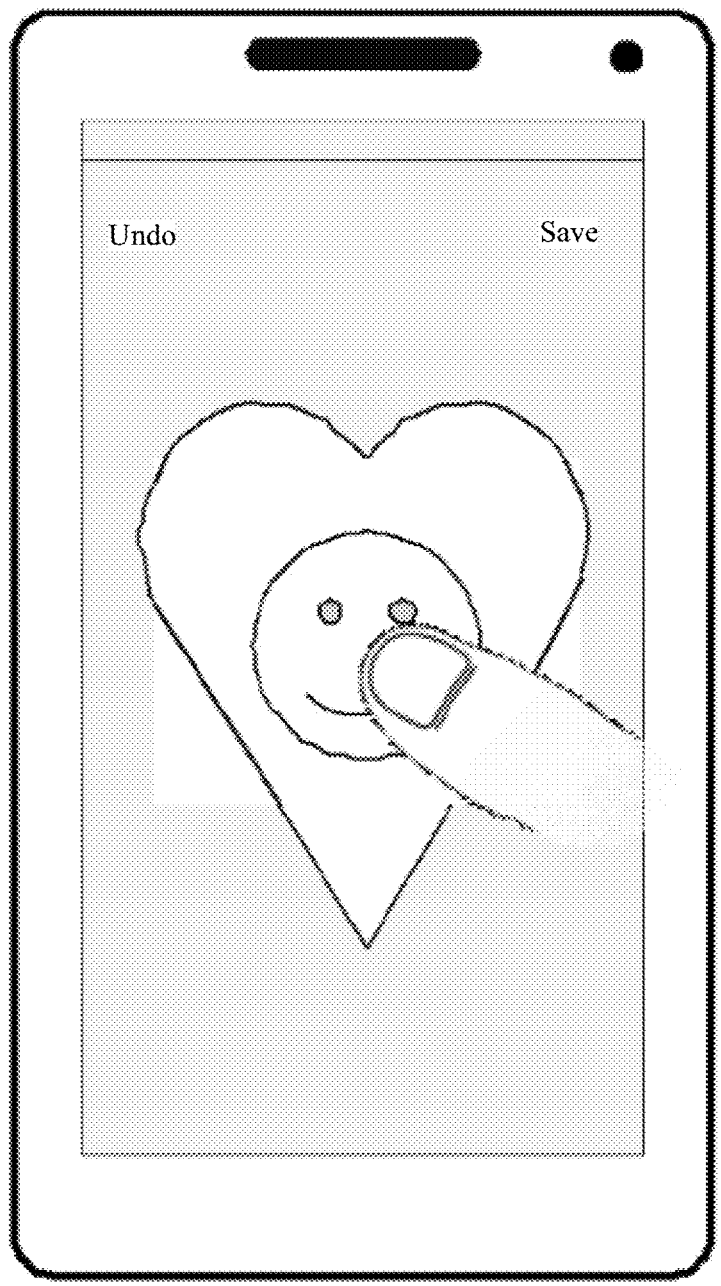
FIG. 22 is another schematic diagram of pasting a pattern according to an embodiment of this application.

Further, optionally, step 704 includes: pasting, when the target area is an image editing area, the copied content to a layer located on the top of the image editing area. For details, refer to FIG. 20, FIG. 21, and FIG. 22. As shown in FIG. 20, a smiling face pattern is selected on a first application interface, and then switching to the second application interface is performed. The second application interface is shown in FIG. 21, and includes a heart-shaped pattern, and then the selected smiling face pattern is pasted at interface coordinates corresponding to a touch location, as shown in FIG. 22. In this case, a layer at which the smiling face image is located is on top of a layer at which the heart-shaped pattern is located.

Further, optionally, after step 704, the foregoing method further includes: using the copied content as to-be-sent content when the target area is a dialog box of a communication application program.

Figure 23:
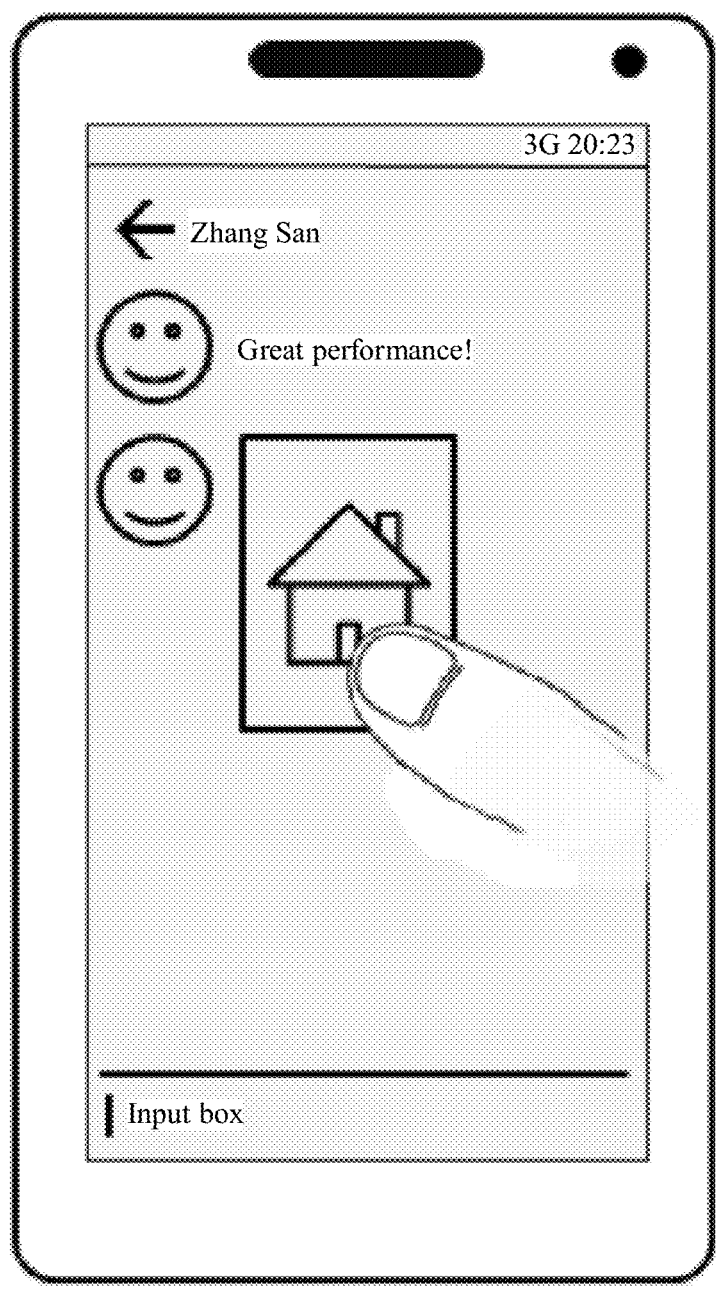
FIG. 23 is another schematic diagram of copying a picture according to an embodiment of this application.
Figure 24:
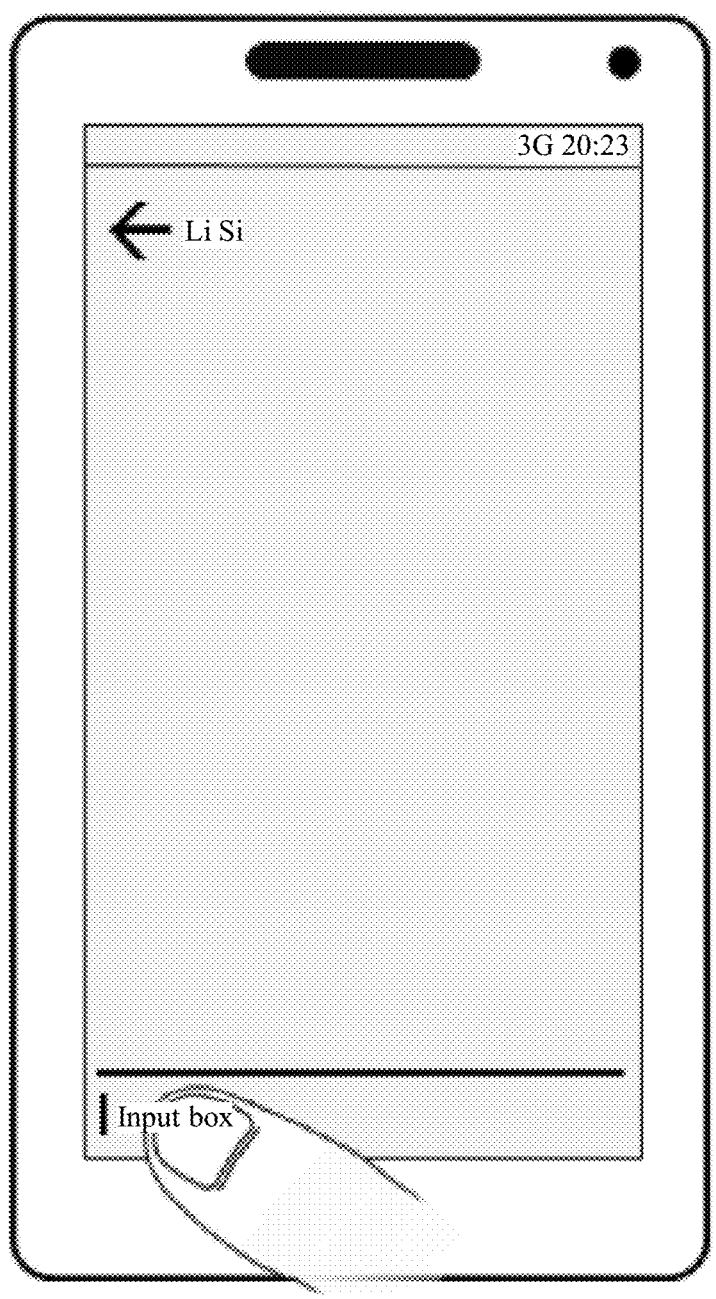
FIG. 24 is another schematic diagram of a target area according to an embodiment of this application.
Figure 25:
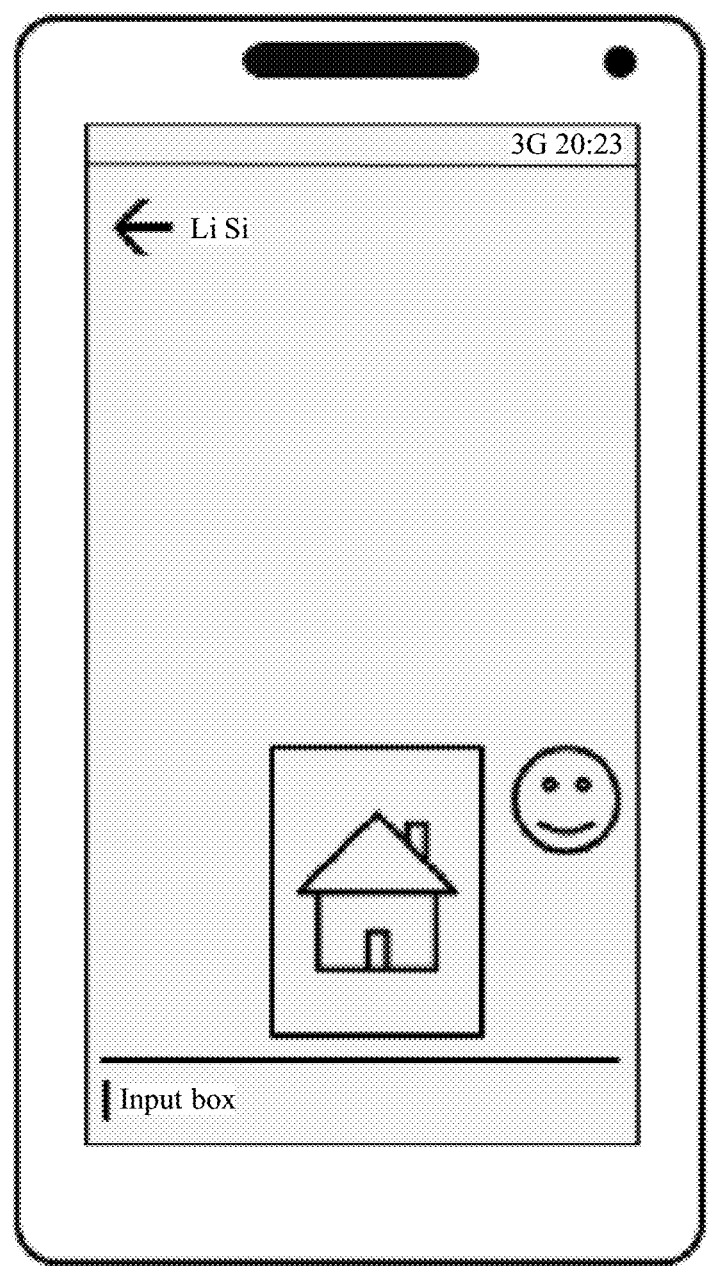
FIG. 25 is a schematic diagram of pasting a picture into a target area according to an embodiment of this application.

Specifically, when a location selected by a finger belongs to a dialog input box of an instant messaging tool, the user equipment may directly send the copied content to a message receiving party. For example, refer to FIG. 23 to FIG. 25. As shown in FIG. 23, on a first chat interface, a house picture is selected through a thumb, and if a fingerprint of the thumb is the first preset fingerprint, the user equipment uses the house picture as the copied content. Then, when the thumb is used to act on a dialog input box of a second chat interface (as shown in FIG. 24), the user equipment uses copied content (that is, the house picture) as to-be-sent content, and sends the house picture to Li Si, as shown in FIG. 25.

Further, optionally, after step 702, the foregoing method further includes: clearing the copied content when a slide operation is detected in a non-pastable area of the to-be-processed interface; clearing the copied content when it is detected that a speed at which a touch object moves to a side of the screen is greater than a preset speed; or clearing the copied content when a double-tapping operation acting on an editable area of the to-be-processed interface is detected.

In the foregoing embodiment, the non-pastable area is an area in the to-be-processed interface excluding the pastable area, for example, a toolbar or a navigation bar. The editable area is an area in which content may be pasted, copied, or modified, for example, a text input area, an image editing area, or a web page content display area.

An action of clearing the copied content may be set in a user-defined manner, for example, sliding in the toolbar, or touching and holding the screen by using an index finger and then quickly moving to a side of the screen, or double-tapping the editable area by using an index finger. In this case, when the foregoing operation is performed by using another finger, the user equipment may not clear the copied content. It may be understood that the action of clearing the copied content is not limited to the foregoing action.

Figure 26:
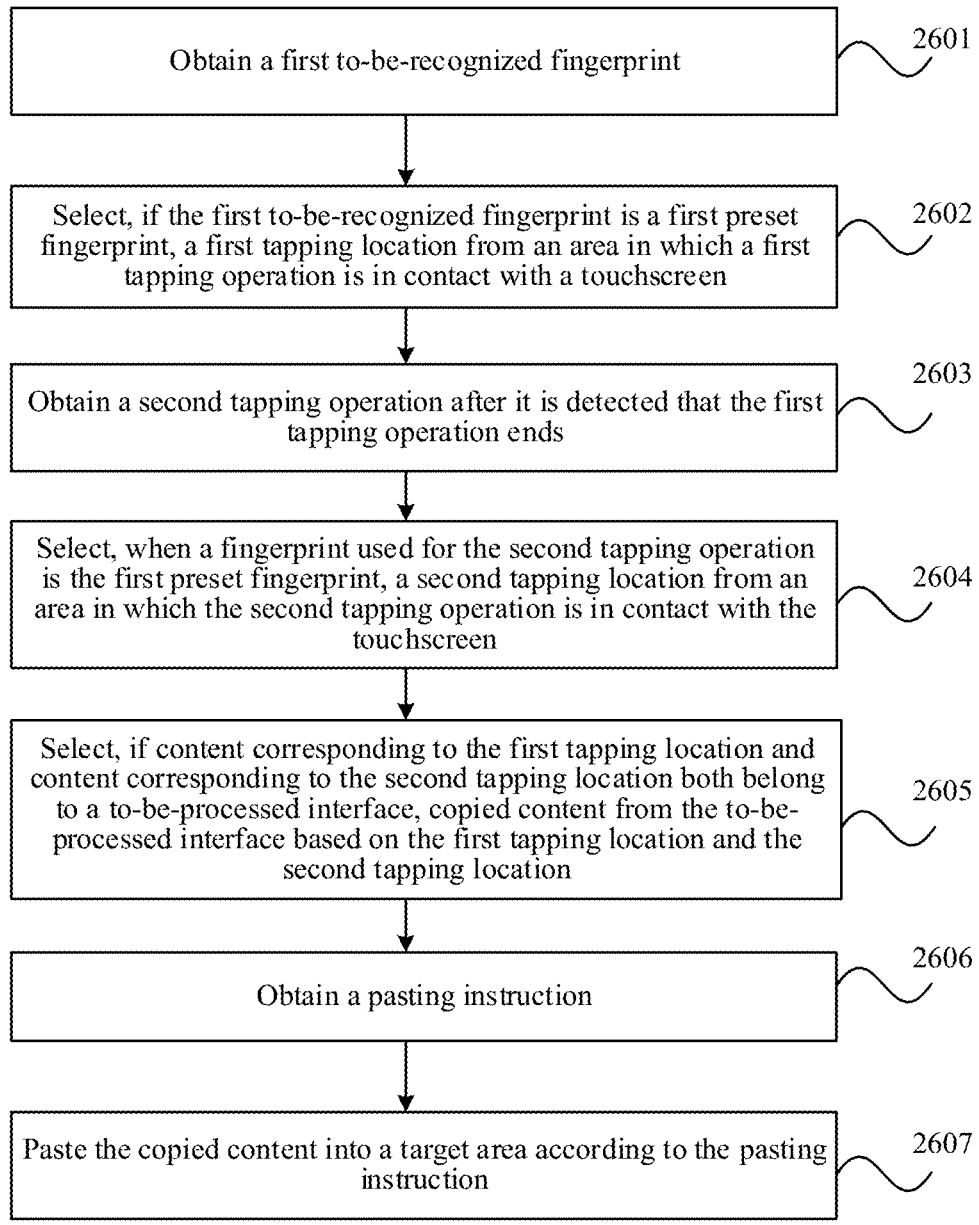
FIG. 26 is another schematic diagram of a copying and pasting method according to an embodiment of this application.

The foregoing embodiments describe a method for implementing copying through a single touch operation, and a method for implementing copying through a plurality of touch operations is described below based on the foregoing embodiments. Referring to FIG. 26, another embodiment of a copying and pasting method in this application includes the following steps.

Step 2601. Obtain a first to-be-recognized fingerprint.

In this embodiment, the touch operation includes a first tapping operation and a second tapping operation. When the first tapping operation acting on a touchscreen is detected, a fingerprint used for the first tapping operation is used as the first to-be-recognized fingerprint.

Step 2602. Select, if the first to-be-recognized fingerprint is a first preset fingerprint, a first tapping location from an area in which the first tapping operation is in contact with the touchscreen.

Step 2603. Obtain the second tapping operation after it is detected that the first tapping operation ends.

Step 2604. Select, when a fingerprint used for the second tapping operation is the first preset fingerprint, a second tapping location from an area in which the second tapping operation is in contact with the touchscreen.

Specifically, user equipment may select a central location as a tapping location from an area in which a finger is in contact with the touchscreen. Certainly, a location close to a center or another location may alternatively be selected as a tapping location according to a preset rule.

In another embodiment, alternatively, when a fingerprint used for the second tapping operation is another preset fingerprint different from the first preset fingerprint, a second tapping location may be selected from an area in which the second tapping operation is in contact with the touchscreen.

Step 2605. Select, if content corresponding to the first tapping location and content corresponding to the second tapping location both belong to the to-be-processed interface, copied content from the to-be-processed interface based on the first tapping location and the second tapping location.

It may be understood that, the "to-be-processed interface" is an interface on which content may be copied (which usually has a word, a picture, or other information that needs to be copied, for example, an interface of a web page on which a word is displayed) other than a similar blank text box or an interface on which there is no copyable content. According to this method, if the second tapping is not performed on the to-be-processed interface, copying is not started, to prevent a misoperation. For example, when a user browses a web page by using a mobile phone, if the user first taps a location in the web page through the first tapping operation, and then taps a blank text box that is at a bottom area of the web page and that is used to make a comment, in this scenario, the user taps the text box to actually make a comment, and does not intend to start copying. In this embodiment, because the blank text box has no copyable content, and is not the to-be-processed interface, copying is not started either, thereby better conforming to a use habit of the user and preventing a misoperation.

It should be noted that, if a fingerprint used for a tapping operation is the first preset fingerprint, the user equipment selects copied content based on the tapping operation; or if a fingerprint used for a tapping operation is not the first preset fingerprint, content selected through the tapping operation is not used as copied content.

Step 2606. Obtain a pasting instruction.

Step 2607. Paste the copied content into a target area according to the pasting instruction.

The target area is a pastable area. Step 2606 and step 2607 are similar to step 803 and step 804 in the embodiment or optional embodiment shown in FIG. 8.

In this embodiment, a copying function is directly triggered through a fingerprint, and steps for copying and pasting can be reduced, thereby improving copying and pasting efficiency. In addition, the copied content is selected through a plurality of touch operations, thereby improving flexibility of performing copying and pasting by using a fingerprint.

In an optional embodiment, fingerprints used for the first tapping operation, the second tapping operation, and a pasting operation are a same fingerprint, the first tapping operation and the second tapping operation act on a non-pastable area, and the pasting operation acts on a pastable area. In this way, a touch operation in the non-pastable area may implement the copying function, and a touch operation in the pastable area may implement a pasting function.

In another optional embodiment, both the fingerprint used for the first tapping operation and the fingerprint used for the second tapping operation are the first preset fingerprint, and a fingerprint used for a pasting operation is a second preset fingerprint, and the first preset fingerprint is different from the second preset fingerprint. In this way, different fingerprints need to be used for the copying operation and the pasting operation, thereby further improving flexibility of performing copying and pasting by using a fingerprint.

In an optional embodiment, a preset fingerprint used to perform matching with the fingerprint used for the first tapping operation (for example, the first preset fingerprint in step 2602), a preset fingerprint used to perform matching with the fingerprint used for the second tapping operation (for example, the first preset fingerprint in step 2604), and the aforementioned pasting fingerprint used for the pasting operation may be all the same or all different, or two thereof are the same and are different from another one.

In another optional embodiment, step 2605 specifically includes: using text information corresponding to the first tapping location as a start point, using text information corresponding to the second tapping location as an end point, and selecting text information from the start point to the end point as the copied content.

For example, a word selected through the first tapping operation is "very", a word selected through the second tapping operation is "sun", text information from "very" to "sun" is selected in an order of words in a document, and the selected text information is used as the copied content.

In another optional embodiment, step 2605 includes: generating, based on interface coordinates corresponding to the first tapping location and interface coordinates corresponding to the second tapping location, a screenshot area in the to-be-processed interface according to a preset area generation rule, and using a pattern in the screenshot area as the copied content.

Figure 27:
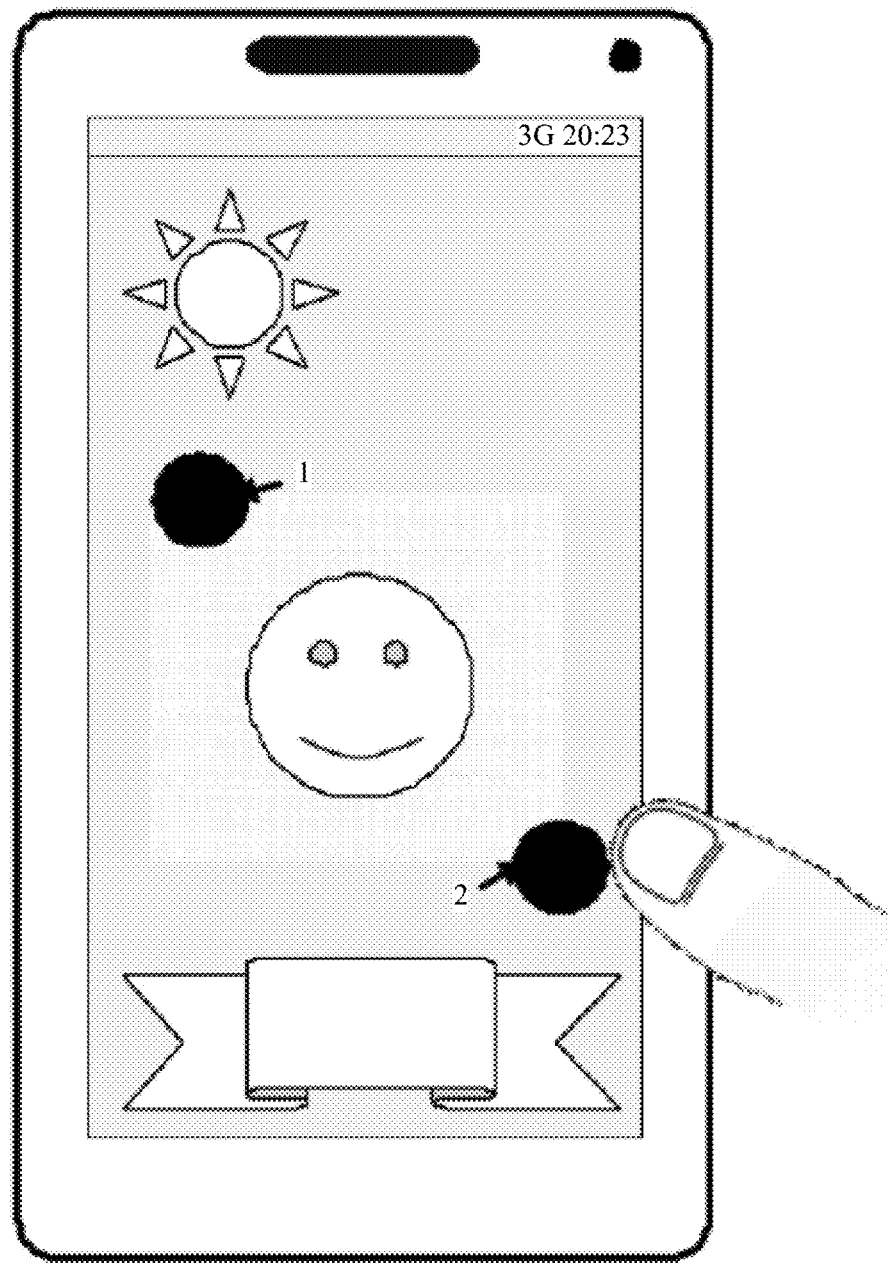
FIG. 27 is a schematic diagram of two touch locations according to an embodiment of this application.
Figure 28:
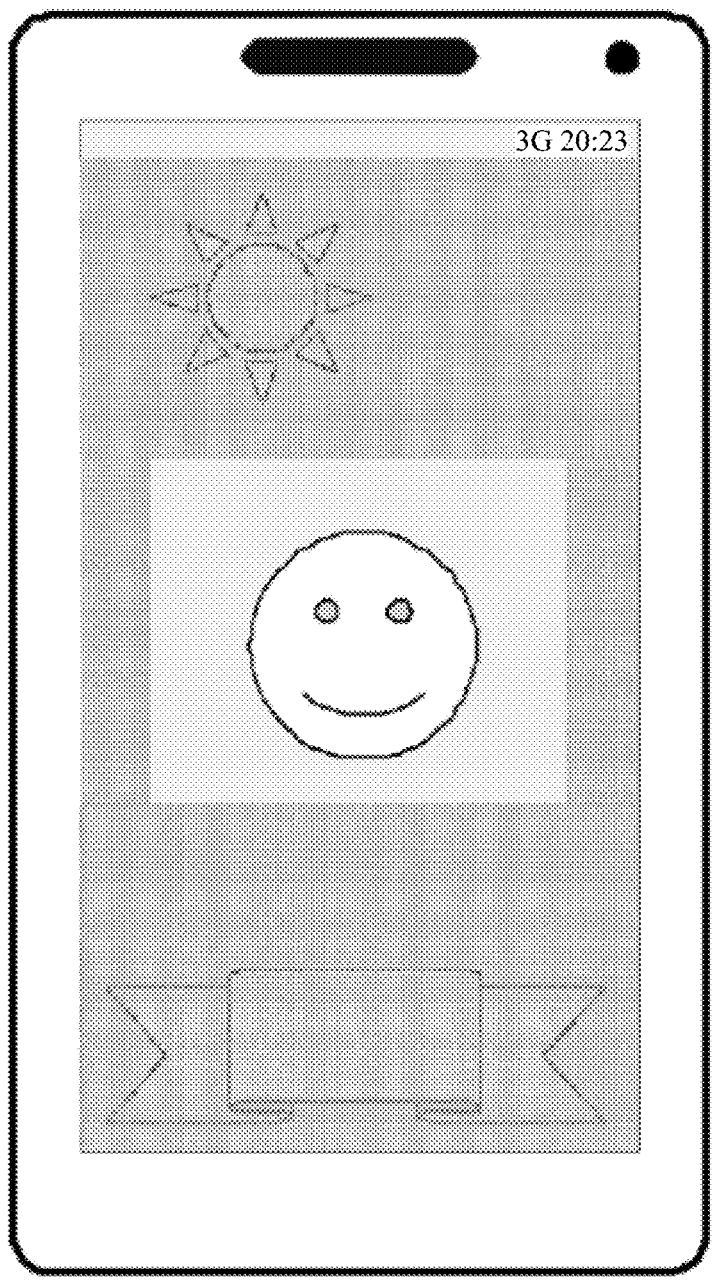
FIG. 28 is another schematic diagram of copying a pattern according to an embodiment of this application.

For example, a location 1 is first selected in a to-be-processed interface by using a finger, and then a location 2 is selected in the to-be-processed interface, as shown in FIG. 27. Then, a rectangle is constructed by using the location 1 and the location 2 as diagonal vertexes, the rectangle is a screenshot area, and the user equipment may select an image in the to-be-processed interface as copied content based on the rectangle, as shown in FIG. 28. Then, a selected pattern is pasted into a target area. Alternatively, another pattern such as a rhombus, a circle, or an ellipse is constructed based on the location 1 and the location 2.

Further, in an optional embodiment, step 2607 includes: using a touch location of one more touch operation acting on the touchscreen as one more touch location; and pasting, according to the pasting instruction, the copied content after content corresponding to the one more touch location. For a specific pasting operation, refer to the embodiment or optional embodiment shown in FIG. 8.

Further, in another optional embodiment, step 2607 includes: pasting, when the target area is an image editing area, the copied content to a layer located on the top of the image editing area. For a specific pasting operation, refer to the embodiment and optional embodiment shown in FIG. 8.

Optionally, after step 2607, the foregoing method further includes: using the copied content as to-be-sent content when the target area is a dialog box of a communication application program.

In another optional embodiment, step 2605 includes: using, when content corresponding to the first tapping location is a first thumbnail and content corresponding to the second tapping location is a second thumbnail, an original picture corresponding to the first thumbnail and an original picture corresponding to the second thumbnail as the copied content.

Specifically, the user equipment may load the original picture corresponding to the first thumbnail to a memory after the first thumbnail is selected, and then load the original picture corresponding to the second thumbnail to the memory after the second thumbnail is selected. During picture pasting, the original pictures corresponding to the foregoing thumbnails are pasted into the target area.

In another optional embodiment, step 2605 includes: using, when content corresponding to the first tapping location is a first picture and content corresponding to the second tapping location is a second picture, the first picture and the second picture as the copied content. It may be understood that, the user equipment may further select more thumbnails or pictures as the copied content based on a subsequent tapping operation in the non-pastable area.

Figure 29:
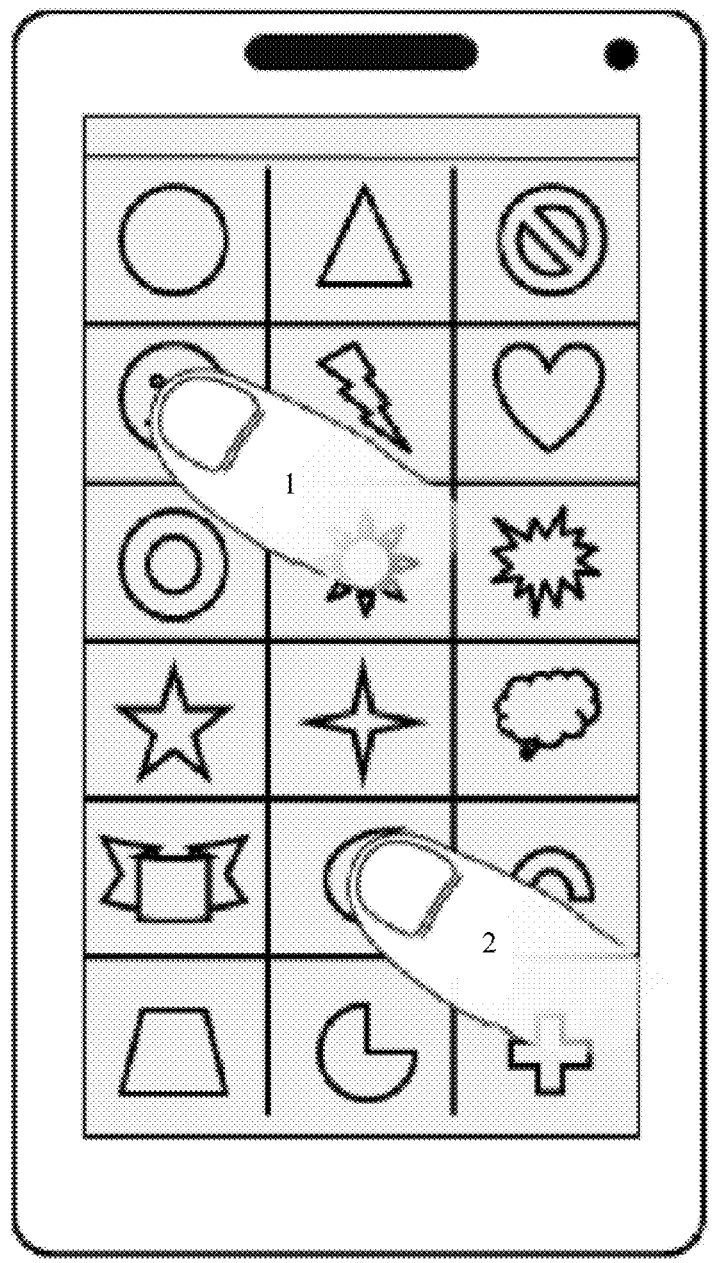
FIG. 29 is a schematic diagram of selecting copied content through two tapping operations according to an embodiment of this application.
Figure 30:
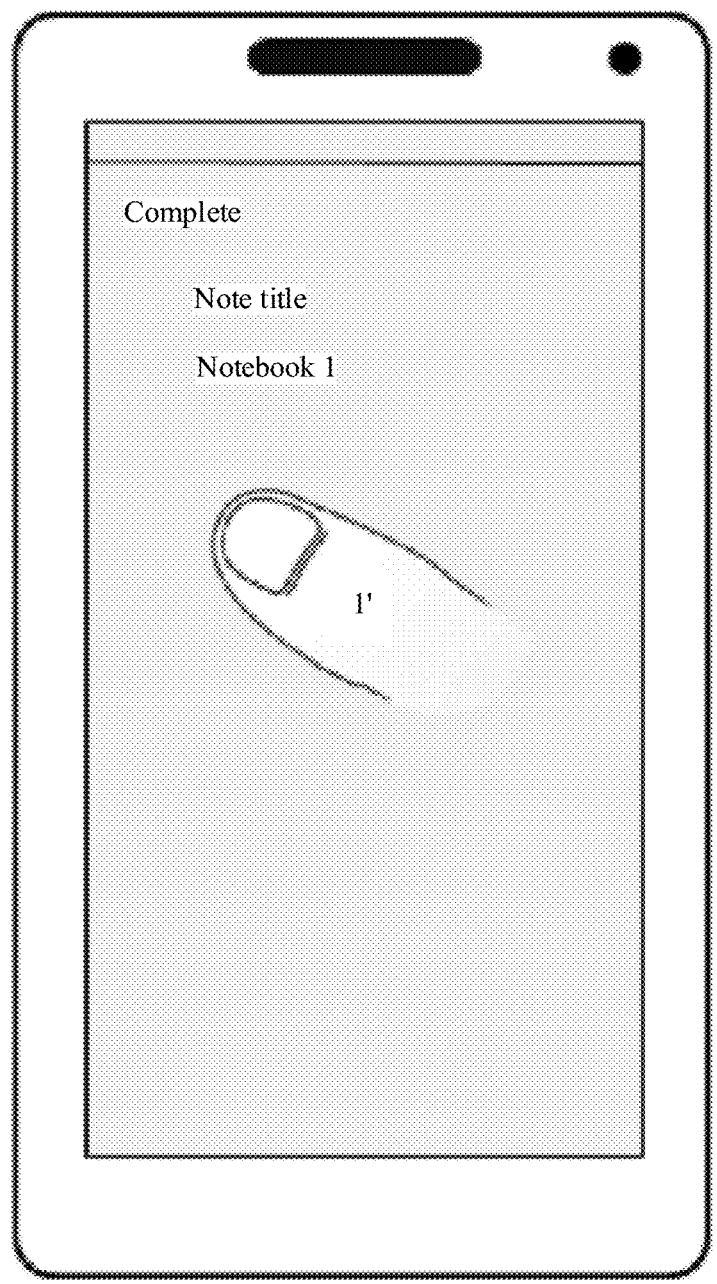
FIG. 30 is another schematic diagram of a target area according to an embodiment of this application.
Figure 31:
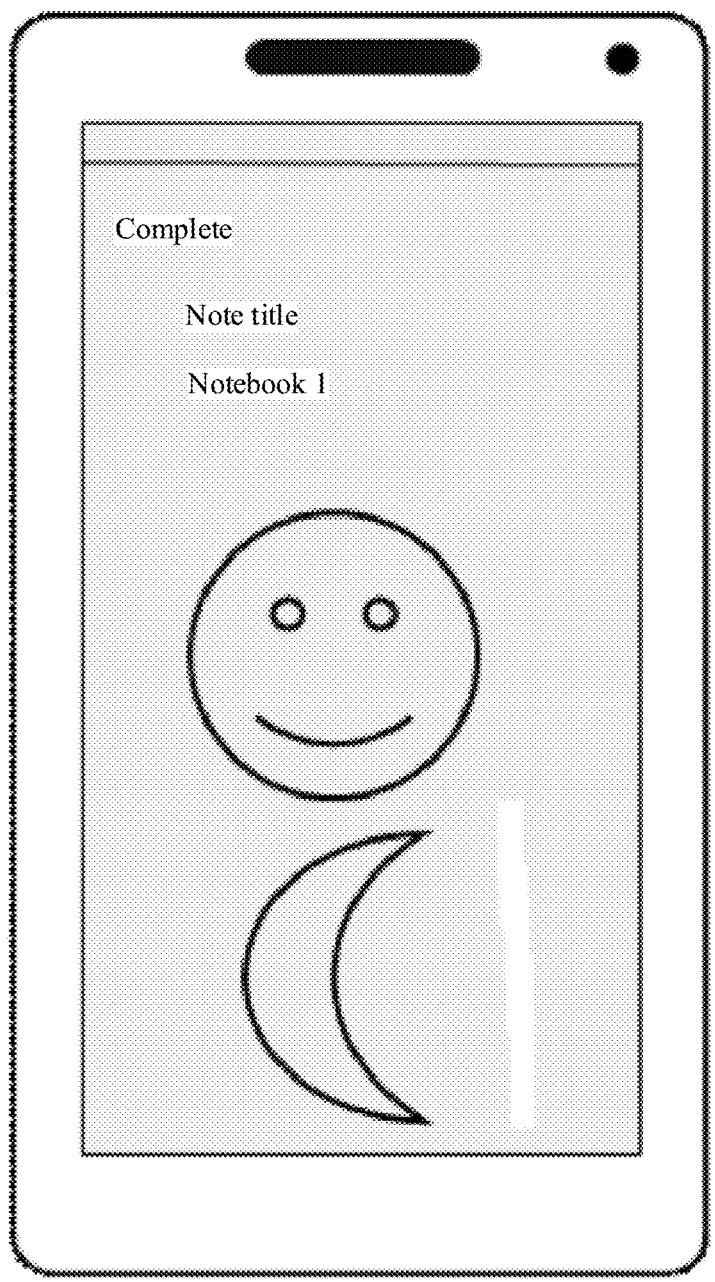
FIG. 31 is another schematic diagram of pasting a pattern into a target area according to an embodiment of this application.

For example, as shown in FIG. 29, a thumbnail of a smiling face pattern and a thumbnail of a moon pattern are selected from a location 1 and a location 2 respectively by using a thumb. When the thumb presses a text input area (a location 1' shown in FIG. 30) on a notebook application interface, the user equipment may determine that the location 1' belongs to a pastable area, and paste original pictures (that is, the smiling face pattern and the moon pattern) corresponding to the thumbnails into a target area, as shown in FIG. 31.

Figure 32:
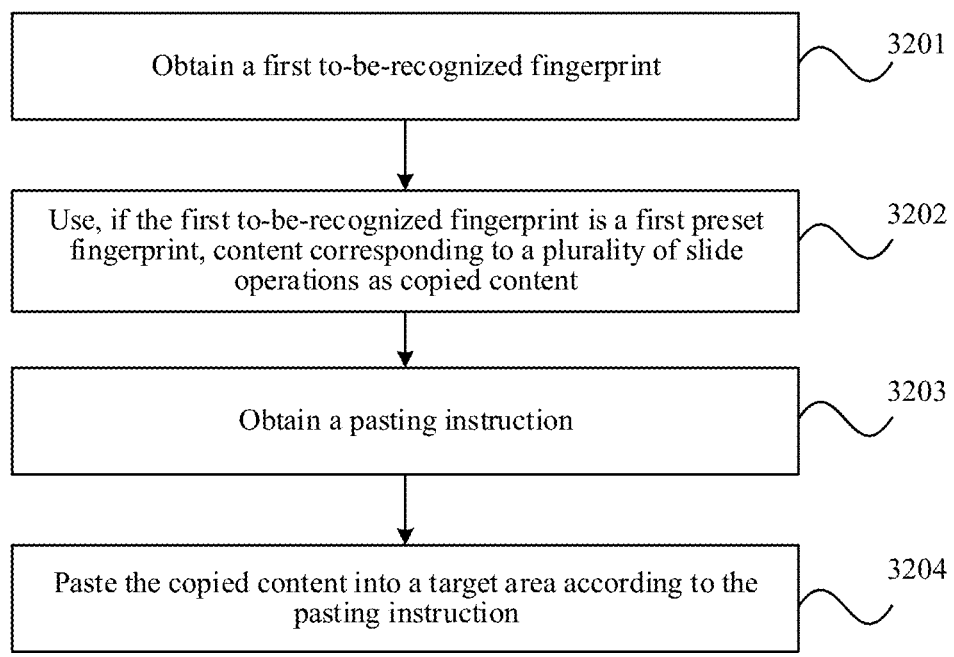
FIG. 32 is another schematic diagram of a copying and pasting method according to an embodiment of this application.

The foregoing embodiments describe a method for selecting copied content through two tapping operations, and a method for selecting copied content through a plurality of slide operations is described below based on the foregoing embodiments. Referring to FIG. 32, another embodiment of a copying and pasting method provided in this application includes the following steps.

Step 3201. Obtain a first to-be-recognized fingerprint.

Step 3202. Use, if the first to-be-recognized fingerprint is a first preset fingerprint, content corresponding to a plurality of slide operations as copied content.

In this embodiment, a touch operation includes a plurality of slide operations. The first to-be-recognized fingerprint includes fingerprints used for the plurality of slide operations (that is, there may a plurality of obtained first to-be-recognized fingerprints). When each of the fingerprints used for the plurality of slide operations is the first preset fingerprint, the content corresponding to the plurality of slide operations is used as the copied content (that is, there may also be a plurality of pieces of copied content). After the copied content is selected, the copied content may be displayed to be in a selected state. For example, the copied content and an area excluding the copied content are differentiated in background colors of different gray scales.

Step 3203. Obtain a pasting instruction.

Step 3204. Paste the copied content into a target area according to the pasting instruction.

The target area is a pastable area. Step 3203 and step 3204 are similar to step 803 and step 804 in the embodiment or optional embodiment shown in FIG. 8.

In this embodiment, the copied content is selected from the to-be-processed interface through a plurality of touch operations. After one touch ends, content corresponding to the touch is used as first copied content. After the second touch ends, content corresponding to the second touch operation is used as second copied content. Therefore, copied content may be selected in a non-pastable area based on the plurality of touch operations. It can be learned that, content of a quite long length can be conveniently and quickly copied in this embodiment. Correspondingly, during pasting, all copied content may be pasted at a time; or a user may be enabled in an interactive manner to select some content that needs to be pasted for pasting. For example, in step S3203, an option including all the copied content is triggered (for example, touch and hold, or a particular fingerprint) to pop up, and the user selects one piece of all the copied content and then obtain the pasting instruction. Correspondingly, in step S3204, the copied content selected by the user is pasted according to the pasting instruction.

In an optional embodiment, the fingerprints used for the plurality of touch operations and a fingerprint used for a pasting operation are a same fingerprint, and the plurality of touch operations act on a non-pastable area, and the pasting operation acts on a pastable area. In this way, a touch operation in the non-pastable area may implement a copying function, and a touch operation in the pastable area may implement a pasting function.

In another optional embodiment, the fingerprints used for the plurality of touch operations are the first preset fingerprint, and a fingerprint used for the pasting operation is a second preset fingerprint, and the first preset fingerprint is different from the second preset fingerprint. In this way, different fingerprints need to be used for a copying operation and a pasting operation, thereby further improving flexibility of performing copying and pasting by using a fingerprint.

In another optional embodiment, alternatively, a plurality of preset fingerprints that may trigger copying operations may be set, and then copying operations are triggered through different fingerprints. The plurality of preset fingerprints that may trigger copying operations may be all different from a pasting fingerprint used for a pasting operation, or one or more of the plurality of preset fingerprints may be the same as a pasting fingerprint.

In another optional embodiment, step 3202 specifically includes: using content corresponding to a touch track of the plurality of slide operations as the copied content.

Figure 33:
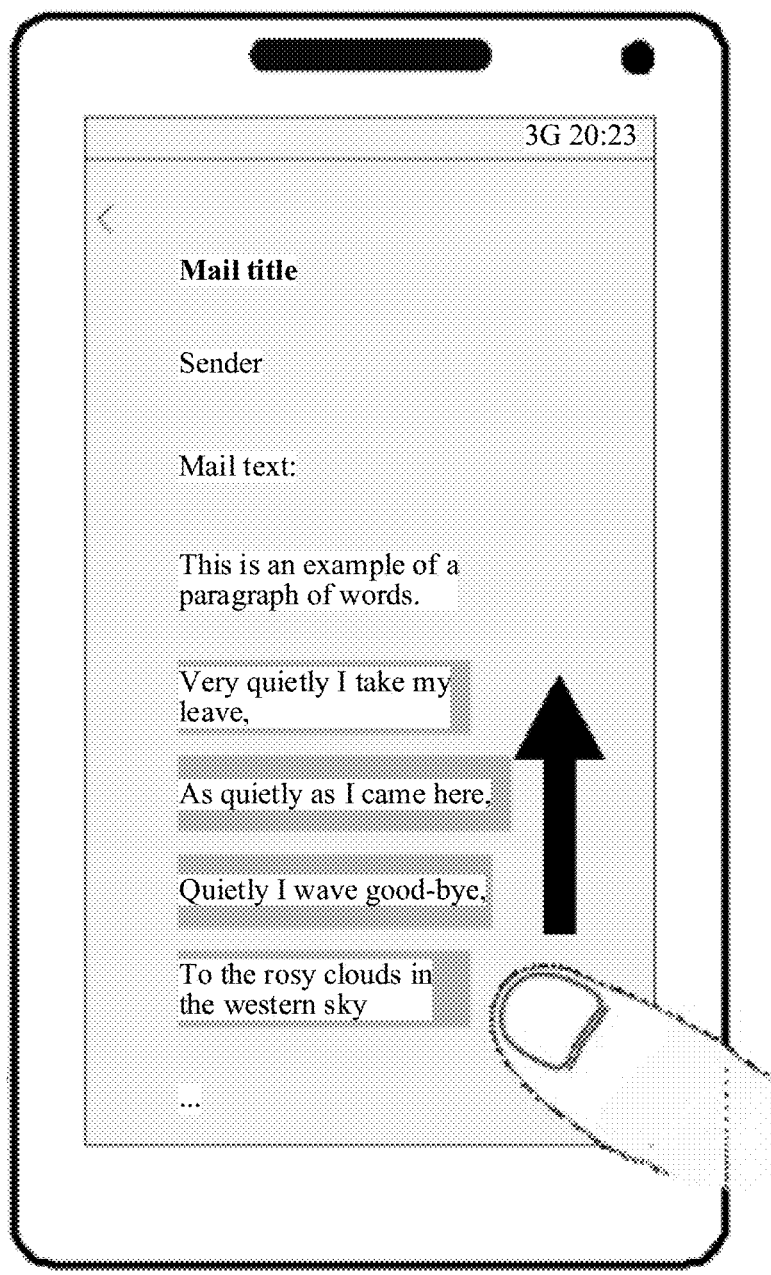
FIG. 33 is a schematic diagram of selecting copied content through a plurality of touch operations according to an embodiment of this application.
Figure 34:
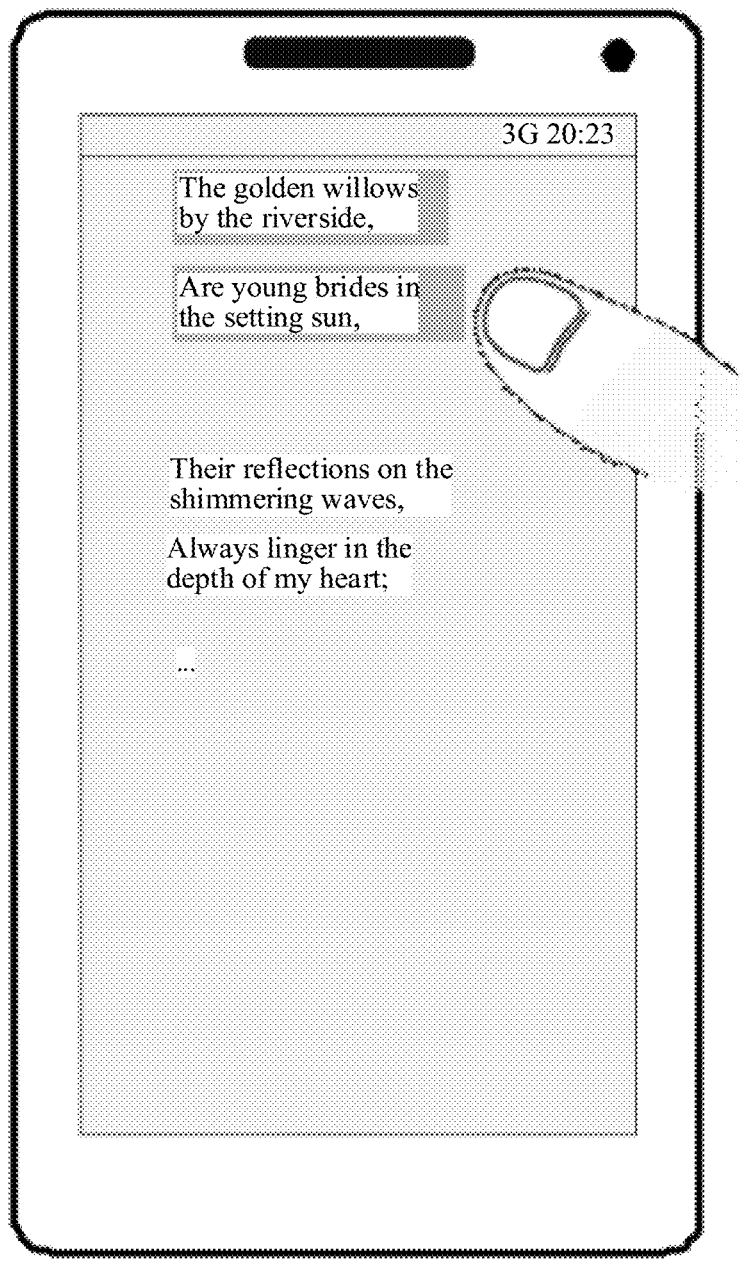
FIG. 34 is another schematic diagram of selecting copied content through a plurality of touch operations according to an embodiment of this application.
Figure 35:
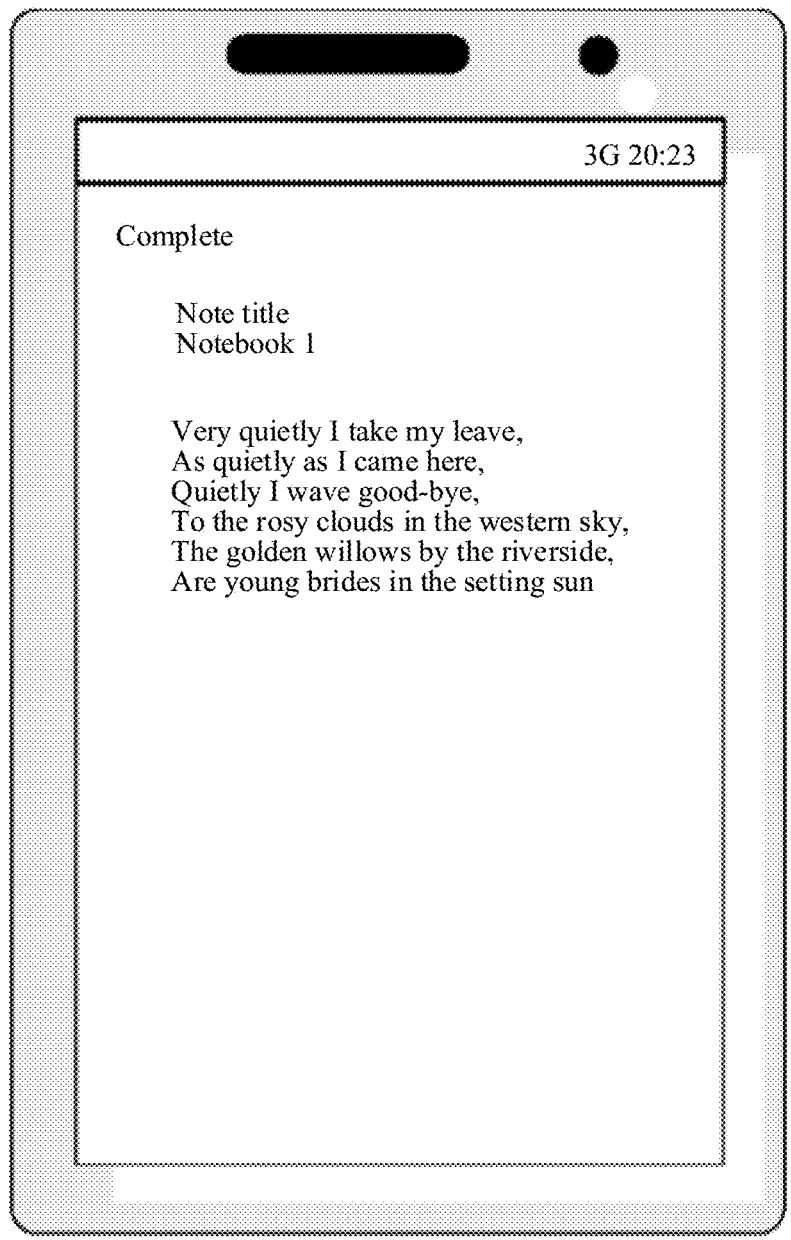
FIG. 35 is another schematic diagram of pasting content into a target area according to an embodiment of this application.

For details, refer to FIG. 33. FIG. 33 is a schematic diagram of a mail interface. A fingerprint of a thumb is a first preset fingerprint, and a fingerprint of an index finger is a second preset fingerprint. User equipment detects a slide operation of the thumb in a non-pastable area, and one line of words is selected through each slide operation. First, "very quietly . . . sky" is selected through four slide operations, then upward slide is performed by using another finger, and after the another finger slides to another word part, "the . . . sun" is selected by using the thumb, as shown in FIG. 34. Then, switching to a notebook application interface is performed. When a pastable area of the notebook application interface is tapped by using the index finger, the user equipment may determine that an area corresponding to the tapping operation is a pastable area and that a fingerprint used for the tapping operation is the fingerprint of the index finger; and read "very quietly . . . sun" from a memory. After "very quietly . . . sun" is loaded to a tapping location, a display effect generated after pasting is completed is shown in FIG. 35.

In an optional embodiment, step 3202 specifically includes: using, when a touch track of the plurality of slide operations forms a closed area and the closed area includes a picture, the picture within the closed area as the copied content.

Figure 36:
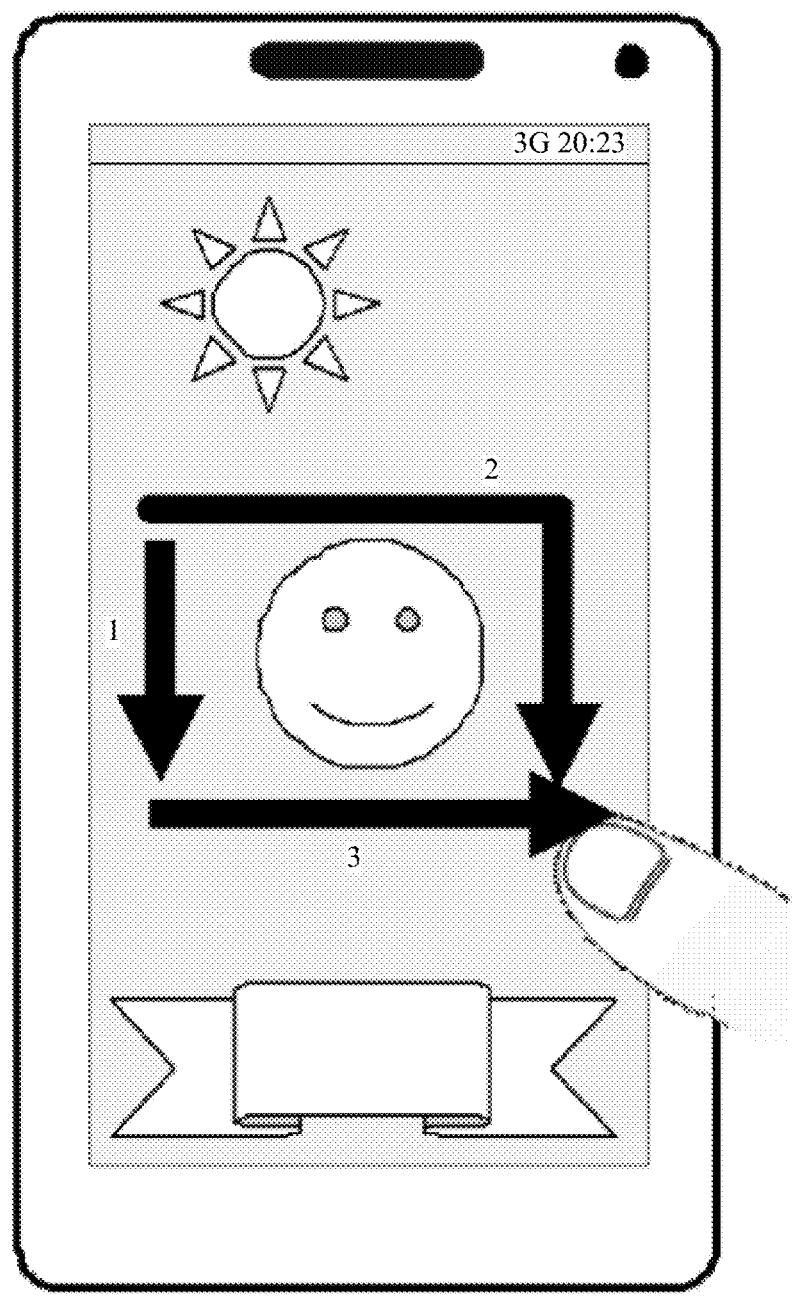
FIG. 36 is a schematic diagram of a plurality of touch operations according to an embodiment of this application.
Figure 37:
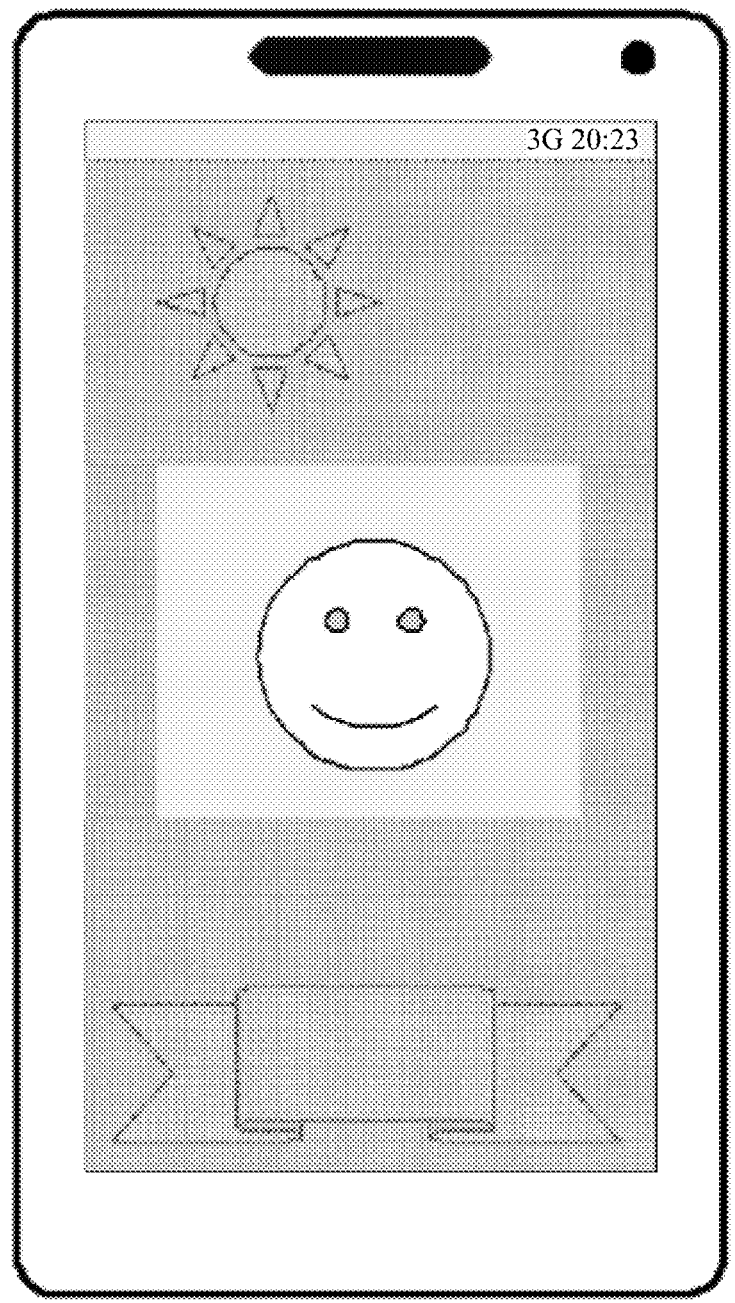
FIG. 37 is another schematic diagram of selecting copied content through a plurality of touch operations according to an embodiment of this application.

Specifically, the user equipment may record slide operations 1, 2, and 3, as shown in FIG. 36. The user equipment determines whether the touch track of the plurality of slide operations forms a closed area; determines, if a closed area is formed, whether the closed area includes a picture; and uses, if the closed area includes a picture, the picture within the closed area as the copied content, as shown in FIG. 37. When a fingerprint used for a slide operation is not the first preset fingerprint, the user equipment does not respond to the slide operation.

Therefore, it can be learned that, a cross-page copying function may be performed based on touch operations of different fingers in this embodiment, thereby improving flexibility of performing copying and pasting by using a fingerprint.

Figure 38:
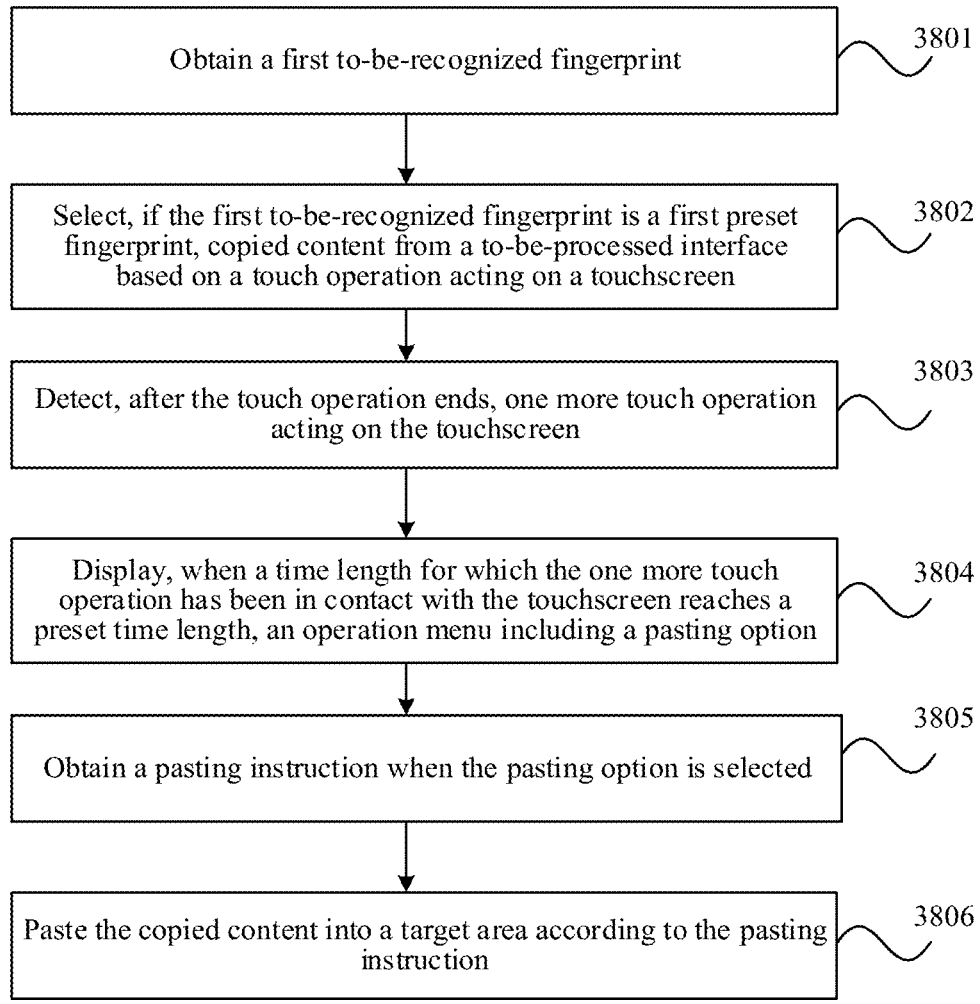
FIG. 38 shows another embodiment of a copying and pasting method according to an embodiment of this application.

The foregoing embodiments describe a method for performing copying by using a fingerprint and performing pasting by using another fingerprint, and based on the foregoing embodiments, a method for performing copying by using a fingerprint and performing pasting in a regular manner is described in the following embodiments. Referring to FIG. 38, another embodiment of a copying and pasting method provided in this application includes the following steps.

Step 3801. Obtain a first to-be-recognized fingerprint.

Step 3802. Select, if the first to-be-recognized fingerprint is a first preset fingerprint, copied content from a to-be-processed interface based on a touch operation acting on a touchscreen.

For step 3801 and step 3802, refer to related descriptions in the foregoing embodiments, for example, step 801 and step 802 in the embodiment or optional embodiment shown in FIG. 8.

Step 3803. Detect, after the touch operation ends, one more touch operation acting on the touchscreen.

Step 3804. Display, when a time length for which the one more touch operation has been in contact with the touchscreen reaches a preset time length, an operation menu including a pasting option.

Step 3805. Obtain a pasting instruction when the pasting option is selected.

Step 3806. Paste the copied content into a target area according to the pasting instruction. The target area is a pastable area.

In this embodiment, a fingerprint used for a copying operation is the first preset fingerprint, and a fingerprint used for a pasting operation is not the first preset fingerprint. For example, the first preset fingerprint is a fingerprint of a thumb. After a user touches and selects copied content by using the thumb, the user performs touch and hold through an index finger. When a time length of pressing reaches the preset time length, user equipment may display the operation menu including the pasting option. When a finger taps the pasting option, the user equipment determines that the pasting option is selected, and obtains the pasting instruction.

Based on this embodiment, the copying function may be directly triggered through a fingerprint, the operation menu does not need to be invoked, and the function option of "copying" does not need to be selected either. Therefore, it can be learned that, based on this application, the operation steps during copying and pasting are reduced, and the copying and pasting efficiency can be improved. Second, content is copied by using a fingerprint, and pasting is performed in a regular manner, thereby improving flexibility of solution implementation.

Figure 39:
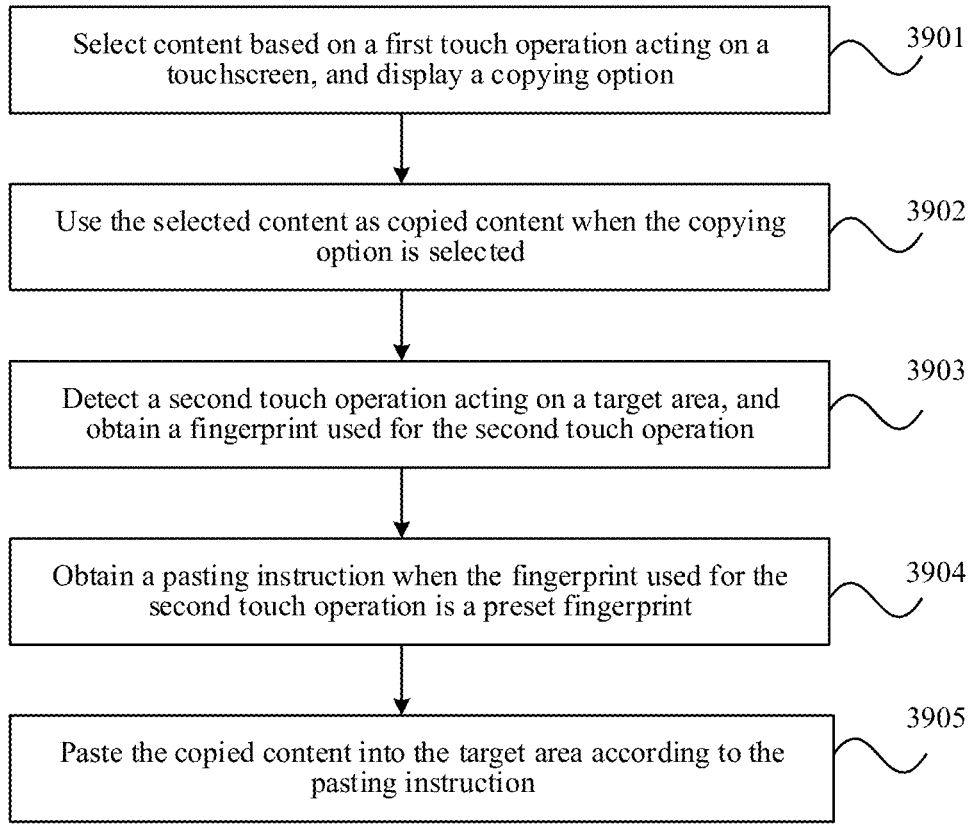
FIG. 39 shows another embodiment of a copying and pasting method according to an embodiment of this application.

The foregoing embodiments describe a method for performing copying by using a fingerprint and performing pasting by using another fingerprint, and a method for performing copying by using a fingerprint and performing pasting in a regular manner, and a method for performing copying in a regular manner and performing pasting by using a fingerprint is described below based on the foregoing embodiments. Referring to FIG. 39, another embodiment of a copying and pasting method provided in this application includes the following steps.

Step 3901. Select content based on a first touch operation acting on a touchscreen, and display a copying option.

In this embodiment, a fingerprint used for the first touch operation is not a preset fingerprint.

In an optional embodiment, when detecting a touch and hold operation, user equipment displays, at pressing locations, information head and tail identifiers, and an operation menu including the copying option, and displays selected content to be in a selected state. When the information head and tail identifiers are moved, the user equipment may increase or reduce the selected content based on movement information of the information head and tail identifiers.

Step 3902. Use the selected content as copied content when the copying option is selected.

Step 3903. Detect a second touch operation acting on a target area, and obtain a fingerprint used for the second touch operation.

Step 3904. Obtain a pasting instruction when the fingerprint used for the second touch operation is the preset fingerprint.

Step 3905. Paste the copied content into a target area according to the pasting instruction.

The target area is a pastable area. For example, a preset fingerprint corresponding to a pasting operation is a fingerprint of a middle finger. When a user slides and selects content on the touchscreen by using an index finger, and touch and hold is performed by using the index finger, the selected content is used as copied content. Then, when the user performs a touch operation on the touchscreen by using a middle finger, if the user equipment detects that the touch operation is performed in the target area, and a fingerprint used for the touch operation is the fingerprint of the middle finger, the copied content is pasted into the target area.

In this embodiment, a pasting function may be implemented through a fingerprint after the content is copied. Compared with the prior art, a step of invoking a pasting option and selecting, by a user, a pasting option is omitted, thereby increasing a pasting speed.

In an optional embodiment, before step 3902, the foregoing method further includes: displaying a cancelation option after the content is selected based on the touch operation acting on the touchscreen; and clearing the copied content when the cancelation option is selected.

Specifically, the cancelation option may be displayed in the operation menu. For example, the operation menu includes options such as copying, cancelation, and editing. The cancelation option may alternatively be displayed as an independent icon. For example, the icon is displayed as x, and is disposed at a lower right corner of the selected content.

In another optional embodiment, in step 3901, the displaying a copying option specifically includes: awakening a fingerprint sensor when an operation area of the first touch operation is an interface of a preset application run on a foreground; obtaining, by using the fingerprint sensor, the fingerprint used for the first touch operation; and displaying the copying option when the fingerprint used for the first touch operation is not the preset fingerprint. The preset application program is an application program having a copyable object, for example, a document application, an SMS message, or a web page. Based on this implementation, a content copying method is provided for a case in which a fingerprint used for a touch operation is not the preset fingerprint. This can avoid power waste resulting from unintended awaking of the fingerprint sensor. It may be understood that, after having been awakened for a period of time, the fingerprint sensor may automatically enter a standby state, to reduce energy consumption.

In another optional embodiment, in step 3903, the obtaining a fingerprint used for the second touch operation specifically includes: awakening the fingerprint sensor when the target area is the interface of the preset application run on the foreground; and obtaining, by using the fingerprint sensor, the fingerprint used for the second touch operation. The preset application program is an application program having a copyable object, for example, a document application, an SMS message, or a web page. Only when the preset application program that is being run is touched, the fingerprint sensor is awakened to obtain a fingerprint. In this way, not only start of the fingerprint sensor can be prevented when the application program is not run, but also trigger of the copying function can be prevented when the user plays a game or watches a video, thereby avoiding power waste resulting from unintended awaking of the fingerprint sensor.

Figure 40:
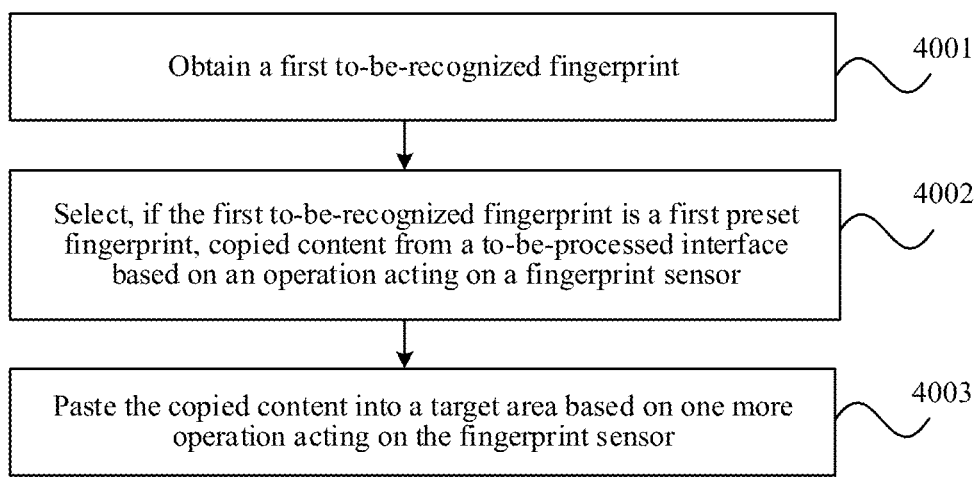
FIG. 40 shows another embodiment of a copying and pasting method according to an embodiment of this application.

The foregoing embodiments describe a method for detecting a touch operation by using a touchscreen to implement copying and pasting, and a method for detecting a fingerprint by using a fingerprint sensor to implement copying and pasting is described below. Referring to FIG. 40, another embodiment of a copying and pasting method provided in this application includes the following steps.

Step 4001. Obtain a first to-be-recognized fingerprint.

Step 4002. Select, if the first to-be-recognized fingerprint is a first preset fingerprint, copied content from a to-be-processed interface based on an operation acting on a fingerprint sensor.

The fingerprint sensor in this embodiment includes a fingerprint detection unit, a fingerprint detection interface may be set through the fingerprint detection unit, and a size of the fingerprint detection interface is basically the same as that of a display screen. The fingerprint sensor may recognize, based on a touch operation acting on the fingerprint detection interface, a fingerprint acting on any point on the fingerprint detection interface, and select copied content based on a time length for which the fingerprint stays on the fingerprint detection interface, a location of the fingerprint, or a track of the fingerprint. For a specific process, refer to a method for selecting copied content based on a touch time length, a touch location, or a touch track in the foregoing embodiments.

Step 4003. Paste the copied content into a target area based on one more operation acting on the fingerprint sensor.

The target area is a pastable area. When one more operation acting on the fingerprint sensor is detected, and the operation acts on the target area, the copied content is pasted into the target area.

In this embodiment, user equipment detects a fingerprint through the fingerprint sensor, and implements a copying and pasting function based on the fingerprint. This provides another copying and pasting method and improves flexibility of the solution embodiment.

Figure 41:
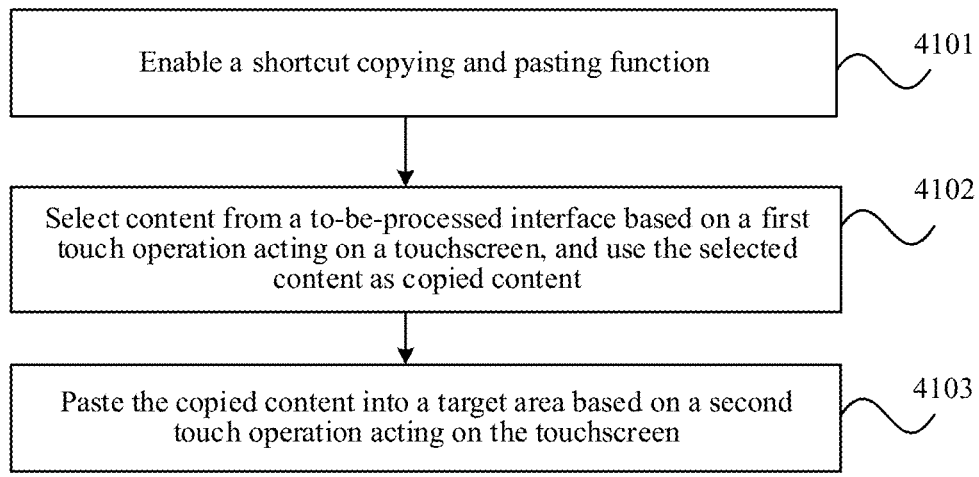
FIG. 41 shows another embodiment of a copying and pasting method according to an embodiment of this application.

In each of the foregoing embodiments, a fingerprint needs to be detected through the fingerprint sensor, and then quick copying and pasting is implemented through the fingerprint. There is a particular limitation when the copying and pasting method is implemented. Based on the foregoing embodiments, a shortcut for a copying and pasting function is provided below, so that a quick copying and pasting function can be implemented without capturing a fingerprint. Referring to FIG. 41, another embodiment of a copying and pasting method provided in this application includes the following steps.

Step 4101. Enable a shortcut copying and pasting function.

In this embodiment, the shortcut copying and pasting function is preset in a system of user equipment. Specifically, the shortcut copying and pasting function is set under system settings, and when the shortcut copying and pasting function is set to be in an enabled state, the user equipment enables the shortcut copying and pasting function. Alternatively, the shortcut copying and pasting function is set in a floating menu on the top of an operation interface, and when the shortcut copying and pasting function is selected, the shortcut copying and pasting function is enabled.

Step 4102. Select content from a to-be-processed interface based on a first touch operation acting on a touchscreen, and use the selected content as copied content.

After the shortcut copying and pasting function is enabled, the user equipment may directly trigger a copying operation without detecting a fingerprint and without performing touch and hold.

Step 4103. Paste the copied content into a target area based on a second touch operation acting on the touchscreen.

Specifically, the target area is a pastable area. When a touch operation acting on the target area is detected, a pasting instruction is obtained, and the copied content is pasted into the target area according to the pasting instruction.

In this embodiment, after the shortcut copying and pasting function is enabled, the user equipment may directly select content as the copied content in response to the touch operation, and then paste the copied content into the target area in the pastable area. Compared with the prior art, this saves processes of displaying and selecting a copying option and a pasting option during copying and pasting, can effectively increase a copying and pasting speed, and has better implementation flexibility.

It may be understood that, in the foregoing embodiment, the "used fingerprint" is a "fingerprint of a finger used by a user for an operation".

Based on the foregoing embodiments, this embodiment provides another method for performing quick copying and/or quick pasting by using a fingerprint. In this embodiment, a conventional sensor not integrated together with a screen (for example, a fingerprint sensor in iPhone 6 or Mate 9) is still used as a fingerprint sensor. In this case, touch and fingerprint recognition may be respectively completed based on two fingers. Details are as follows:

In step 701 in the foregoing embodiments, the fingerprint sensor may be pressed and held by a finger A, to input a fingerprint. Moreover (or "later"), the screen may be touched by using another finger B, to complete various operations (for example, selection of copied content).

In step 702, if an instruction of the finger A is the first preset fingerprint, the copied content is selected from the to-be-processed interface based on a touch operation of the finger B acting on the touchscreen. Moreover, a final operation is completed through step 703 and step 704.

For implementation of each step, refer to the implementation method in the foregoing embodiments. Details are not described herein again.

In this embodiment, quick copying and/or pasting can be implemented without improving hardware, thereby reducing costs.

Based on the foregoing embodiments, this embodiment provides another method for performing quick copying and/or quick pasting by using a fingerprint. In this embodiment, the fingerprint sensor may be a fingerprint sensor not integrated together with an electronic device at delivery of the electronic device, that is, a fingerprint sensor used as an accessory of the electronic device. For example, the fingerprint sensor may be individually made into an independent hardware device, and then connected to an existing electronic device (for example, a computer, a notebook computer, or a mobile phone) in a wireless or wired manner. Certainly, the fingerprint sensor may alternatively be integrated into some existing peripherals (for example, a keyboard and a mouse).

In an example in which the fingerprint sensor is integrated into a mouse, a user may perform quick copying and/or pasting by using the mouse having the fingerprint sensor. For example, the fingerprint sensor may be disposed at a location of a left button of the mouse. When the user presses and holds the left button, a fingerprint is recognized. If the fingerprint is the same as a preset fingerprint, selected content is copied (selection may still be performed in an existing manner of pressing and holding the left button and moving the mouse), and then the left button is released to complete copying. Pasting may also be performed based on a fingerprint or in a regular manner. For details, refer to the foregoing embodiments. Details are not described herein again.

In this embodiment, even if the electronic device has no fingerprint sensor, quick copying and/or pasting may still be implemented through an external fingerprint sensor.

The copying and pasting method provided in this application is described above, and a data processing apparatus provided in this application is described below. The data processing apparatus has a function of implementing the copying and pasting method according to any embodiment shown in FIG. 7 to FIG. 38, or the embodiment shown in FIG. 40 or FIG. 41.

Figure 42:
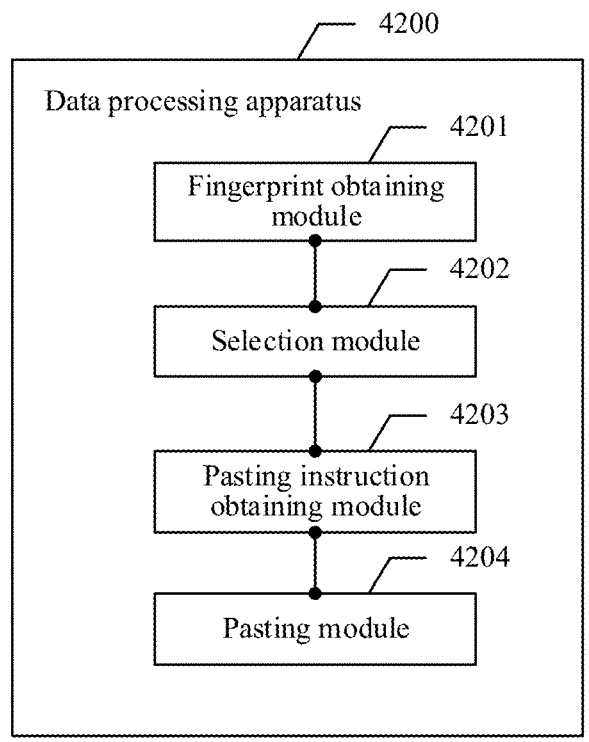
FIG. 42 shows an embodiment of a data processing apparatus according to an embodiment of this application.

Referring to FIG. 42, an embodiment of a data processing apparatus 4200 includes:

a fingerprint obtaining module 4201, configured to obtain a first to-be-recognized fingerprint;

a selection module 4202, configured to select, if the first to-be-recognized fingerprint is a first preset fingerprint, copied content from a to-be-processed interface based on a touch operation acting on a touchscreen;

a pasting instruction obtaining module 4203, configured to obtain a pasting instruction; and a pasting module 4204, configured to paste the copied content into a target area according to the pasting instruction, where the target area is a pastable area.

The fingerprint obtaining module 4201 may be specifically a fingerprint sensor. For details, refer to the description of the fingerprint sensor in the foregoing embodiments.

In some possible embodiments, the fingerprint obtaining module 4201 is specifically configured to obtain, when a touch operation acting on the touchscreen is detected, a fingerprint used for the touch operation; and use the fingerprint used for the touch operation as the first to-be-recognized fingerprint.

In some other possible embodiments, the fingerprint obtaining module 4201 is specifically configured to detect a touch operation acting on the touchscreen; and obtain, when an operation area of the touch operation is an interface of a preset application program run on a foreground, a fingerprint used for the touch operation, and use the fingerprint used for the touch operation as the first to-be-recognized fingerprint.

In some possible embodiments, the selection module 4202 is specifically configured to select the copied content from the to-be-processed interface based on a touch track, on the touchscreen, of the touch operation acting on the touchscreen.

Further, in some other possible embodiments, the selection module 4202 is specifically configured to use, when content corresponding to the touch operation acting on the touchscreen is a multimedia file, the multimedia file as the copied content.

Figure 43:
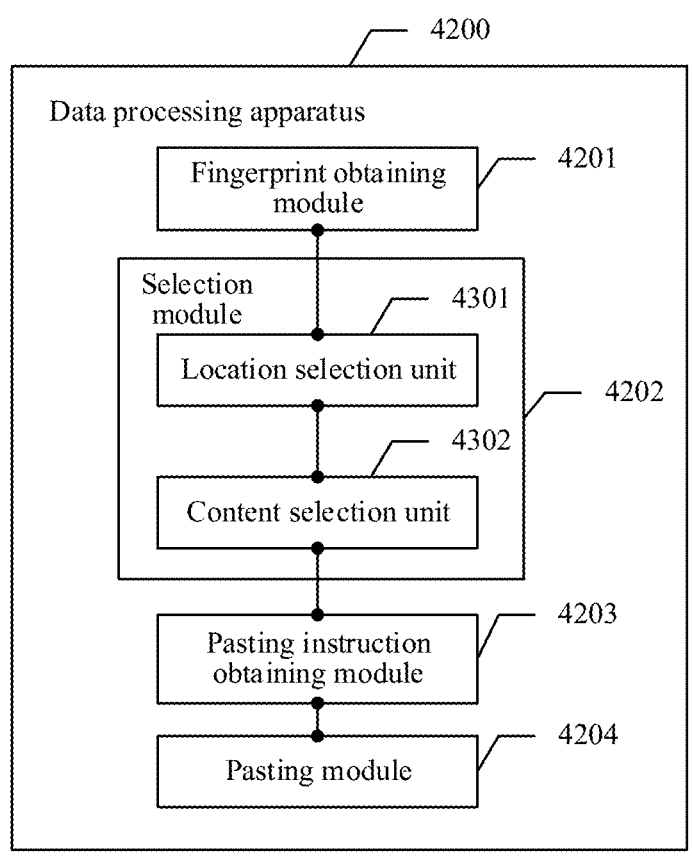
FIG. 43 shows another embodiment of a data processing apparatus according to an embodiment of this application.

Referring to FIG. 43, in some possible embodiments, the selection module 4202 includes:

a location selection unit 4301, configured to select, when the touch operation includes a first tapping operation and a second tapping operation, a first tapping location from an area in which the first tapping operation is in contact with the touchscreen, where the first to-be-recognized fingerprint is a fingerprint used for the first tapping operation, where the location selection unit 4301 is further configured to obtain the second tapping operation after it is detected that the first tapping operation ends; and select, when a fingerprint used for the second tapping operation is the first preset fingerprint, a second tapping location from an area in which the second tapping operation is in contact with the touchscreen; and a content selection unit 4302, configured to select, if content corresponding to the first tapping location and content corresponding to the second tapping location both belong to the to-be-processed interface, the copied content from the to-be-processed interface based on the first tapping location and the second tapping location.

In some possible embodiments, the content selection unit 4302 is specifically configured to use text information corresponding to the first tapping location as a start point, use text information corresponding to the second tapping location as an end point, and select text information from the start point to the end point as the copied content.

Further, in some other possible embodiments, the content selection unit 4302 is configured to generate, based on interface coordinates corresponding to the first tapping location and interface coordinates corresponding to the second tapping location, a screenshot area in the to-be-processed interface according to a preset area generation rule, and use a pattern in the screenshot area as the copied content.

In some possible embodiments, the selection module 4202 is specifically configured to use, when the touch operation includes a plurality of slide operations and the plurality of slide operations act on a non-pastable area of the to-be-processed interface, content corresponding to the plurality of slide operations in the non-pastable area as the copied content.

In some other possible embodiments, the pasting instruction obtaining module 4203 is specifically configured to detect, after the touch operation ends, one more touch operation acting on the target area; display, when a time length for which the one more touch operation has been in contact with the touchscreen reaches a preset time length, an operation menu including a pasting option; and obtain the pasting instruction when the pasting option is selected.

In some other possible embodiments, the pasting instruction obtaining module 4203 is specifically configured to detect, after the touch operation ends, one more touch operation acting on the target area; and obtain the pasting instruction when a fingerprint used for the one more touch operation is the second preset fingerprint.

In some possible embodiments, the data processing apparatus 4200 further includes a clearing module, configured to clear the copied content when a slide operation is detected in a non-pastable area of the to-be-processed interface.

In some other possible embodiments, the data processing apparatus 4200 further includes:

a clearing module, configured to clear the copied content when it is detected that a speed at which a touch object moves to a side of the screen is greater than a preset speed; or a clearing module, configured to clear the copied content when a double-tapping operation acting on an editable area of the to-be-processed interface is detected.

Figure 44:
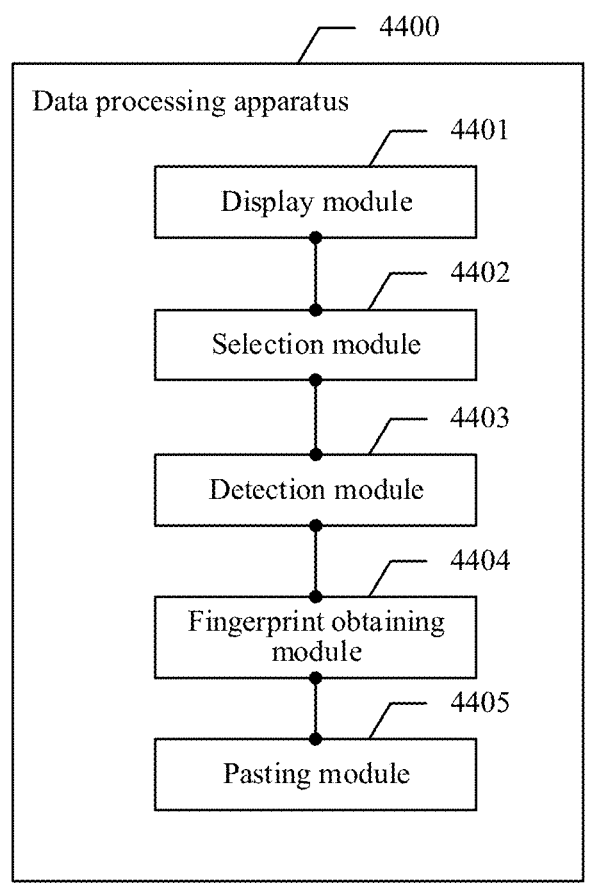
FIG. 44 shows another embodiment of a data processing apparatus according to an embodiment of this application.

Referring to FIG. 44, this application further provides a data processing apparatus that can implement the copying and pasting method in the embodiment shown in FIG. 39. An embodiment of the data processing apparatus 4400 includes:

a display module 4401, configured to select content based on a first touch operation acting on a touchscreen, and display a copying option, where a fingerprint used for the first touch operation is not a preset fingerprint;

a selection module 4402, configured to use the selected content as copied content when the copying option is selected;

a detection module 4403, configured to detect a second touch operation acting on a target area;

a fingerprint obtaining module 4404, configured to obtain a fingerprint used for the second touch operation; and a pasting module 4405, configured to paste the copied content into the target area when the second touch operation acting on the target area is detected and the fingerprint used for the second touch operation is a preset fingerprint, where the target area is a pastable area.

In some embodiments, the display module 4401 is further configured to display a cancelation option after the content is selected based on the first touch operation acting on the touchscreen. The data processing apparatus 4400 further includes a clearing module, configured to clear the copied content when the cancelation option is selected.

In some other embodiments, the detection module 4403 is further configured to obtain, after the selection module 4402 selects the content based on the first touch operation acting on the touchscreen and when an operation area of the first touch operation is an interface of a preset application run on a foreground, the fingerprint used for the first touch operation; and the display module 4401 is specifically configured to display the copying option when the fingerprint used for the first touch operation is not the preset fingerprint.

In some other embodiments, the detection module 4403 is specifically configured to awaken, after detecting the second touch operation acting on the target area, the fingerprint obtaining module when the target area is the interface of the preset application run on the foreground; and the fingerprint obtaining module 4404 is specifically configured to obtain the fingerprint used for the second touch operation.

The foregoing embodiments may be implemented by a combination of software (various programs run on a CPU, such as an operating system, a driver, and an application program) and hardware (for example, a CPU or a memory). When software is used to implement the embodiments, all or some of the embodiments may be implemented in a form of a computer program product.

Based on the foregoing embodiments, an embodiment of this application discloses an electronic device (for example, various electronic mobile devices such as a mobile phone, a notebook computer, and a computer), the electronic device has a touchscreen-integrated fingerprint sensor or has a conventional fingerprint sensor not integrated into a touchscreen, and the electronic device further includes a CPU and a memory, where the memory is configured to store a software instruction required for performing the method in the foregoing embodiments, and the CPU is configured to read the software instruction and perform the method in the foregoing embodiments.

Based on the foregoing embodiments, an embodiment of this application discloses a computer program product, including one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Based on the foregoing embodiments, an embodiment of this application discloses a computer readable storage medium storing a software instruction required by a CPU to run the method in the foregoing embodiments.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A copying and pasting method, applied to a user equipment, the method comprising:
   obtaining a first to-be-recognized fingerprint;
   determining that the first to-be-recognized fingerprint is a first preset fingerprint;
   in accordance with determining the first to-be-recognized fingerprint is the first preset fingerprint, selecting copied content from a to-be-processed interface based on a touch operation acting on a touchscreen;
   pasting the copied content into a target area in response to obtaining a pasting instruction; and
   clearing the copied content in response to detecting a slide operation in a non-pastable area of the to-be-processed interface, wherein detecting the slide operation is one of the following:
   i. detecting a speed at which a touch object moves to a side of the screen is greater than a preset speed; or
   ii. detecting a double-tapping operation acting on an editable area of the to-be-processed interface.

2. The method according to claim 1, wherein obtaining the first to-be-recognized fingerprint comprises:
- determining that a touch operation is detected on the touchscreen;
- in accordance with determining the touch operation is detected, obtaining, by using a fingerprint sensor, a fingerprint used for the touch operation; and
- using the fingerprint used for the touch operation as the first to-be-recognized fingerprint.

3. The method according to claim 1, wherein obtaining the first to-be-recognized fingerprint comprises:
- detecting a touch operation acting on the touchscreen;
- determining that an operation area of the touch operation is an interface of a preset application program run on a foreground;
- in accordance with determining the operation area is the interface, awakening a fingerprint sensor; and
- obtaining, by using the fingerprint sensor, a fingerprint used for the touch operation, and using the fingerprint used for the touch operation as the first to-be-recognized fingerprint.

4. The method according to claim 1, wherein the touch operation comprises a first tapping operation and a second tapping operation, and
- wherein selecting copied content from the to-be-processed interface based on the touch operation acting on the touchscreen comprises:
- selecting a first tapping location from an area in which the first tapping operation is in contact with the touchscreen, wherein the first to-be-recognized fingerprint is a fingerprint used for the first tapping operation;
- obtaining the second tapping operation after it is detected that the first tapping operation ends;
- determining that a fingerprint used for the second tapping operation is a second preset fingerprint;
- in accordance with determining the fingerprint is the second preset fingerprint, selecting a second tapping location from an area in which the second tapping operation is in contact with the touchscreen, wherein the second preset fingerprint is the same as the first preset fingerprint;
- determining that content to associated with the first tapping location and content to associated with the second tapping location both belong to the to-be-processed interface; and
- in accordance with determining that the contents belong to the to-be-processed interface, selecting the copied content from the to-be-processed interface based on the first tapping location and the second tapping location.

5. The method according to claim 1, wherein selecting copied content from the to-be-processed interface based on the touch operation acting on the touchscreen comprises:
- determining that the touch operation comprises a plurality of slide operations and the plurality of slide operations act on the to-be-processed interface; and
- in accordance with determining the touch operation comprises the plurality of slide operations which act on the to-be-processed interface, using content associated with the plurality of slide operations as the copied content.

6. The method according to claim 1, wherein obtaining the pasting instruction comprises:
- detecting, after the touch operation ends, one more touch operation acting on the target area;
- determining a time length for which the one more touch operation has been in contact with the touchscreen reaches a preset time length;
- in accordance with determining the time length reaches a preset time length, displaying an operation menu comprising a pasting option;
- determining that the pasting option is selected; and
- in accordance with determining the pasting option is selected, obtaining the pasting instruction.

7. The method according to claim 1, wherein obtaining the pasting instruction comprises:
- detecting, after the touch operation ends, one more touch operation acting on the target area;
- determining that a fingerprint used for the one more touch operation is the second preset fingerprint; and
- in accordance with determining that the fingerprint is the second preset fingerprint, obtaining the pasting instruction.

8. User equipment comprising:
- a touchscreen, a processor, a memory, and a fingerprint sensor, all of which are connected by a bus;
- wherein the touchscreen is configured to detect a touch operation;
- wherein the fingerprint sensor is configured to detect a fingerprint used for the touch operation;
- wherein the memory is configured to store a processor-executable program which causes the processor to perform:
  - obtaining a first to-be-recognized fingerprint;
  - determining that the first to-be-recognized fingerprint is a first preset fingerprint;
  - in accordance with determining that the first to-be-recognized fingerprint is the first preset fingerprint, selecting, copied content from a to-be-processed interface based on a touch operation acting on a touchscreen; and
  - after selecting the copied content from the to-be-processed interface based on the touch operation acting on the touchscreen:
    - (a) obtaining a pasting instruction and pasting the copied content into a target area according to the pasting instruction; or
    - (b) detecting a slide operation in a non-pastable area of the to-be-processed interface and clearing the copied content in response to detecting the slide operation, wherein detecting the slide operation includes one of the following:
      - i. determining that a speed at which a touch object moves to a side of the screen is greater than a preset speed is detected; or
      - ii. determining a double-tapping operation acting on an editable area of the to-be-processed interface is detected.

9. The user equipment according to claim 8, wherein the fingerprint sensor is disposed below the touchscreen.

10. The user equipment according to claim 8, wherein the processor is further configured to perform:
- determining that a touch operation acting on the touchscreen is detected;
- in accordance with determining that the touch operation is detected, obtaining, by using the fingerprint sensor, a fingerprint used for the touch operation; and
- using the fingerprint used for the touch operation as the first to-be-recognized fingerprint.

11. The user equipment according to claim 8, wherein the processor is further configured to perform:
- detecting a touch operation acting on the touchscreen;
- determining that an operation area of the touch operation is an interface of a preset application program run on a foreground;

in accordance with determining that the operation area is the interface, awakening a fingerprint sensor; and
obtaining, by using the fingerprint sensor, a fingerprint used for the touch operation, and using the fingerprint used for the touch operation as the first to-be-recognized fingerprint.

12. The user equipment according to claim 8, wherein the touch operation comprises a first tapping operation and a second tapping operation, and the processor is further configured to perform:
selecting a first tapping location from an area in which the first tapping operation is in contact with the touchscreen, wherein the first to-be-recognized fingerprint is a fingerprint used for the first tapping operation;
obtaining the second tapping operation after it is detected that the first tapping operation ends;
determining that a fingerprint used for the second tapping operation is a second preset fingerprint;
in accordance with the determining that the fingerprint is the second preset fingerprint, selecting a second tapping location from an area in which the second tapping operation is in contact with the touchscreen, wherein the second preset fingerprint is the same as the first preset fingerprint;
determining that content associated with the first tapping location and content associated with the second tapping location both belong to the to-be-processed interface; and
in accordance with determining that the contents belong to the to-be-processed interface, selecting, the copied content from the to-be-processed interface based on the first tapping location and the second tapping location.

13. The user equipment according to claim 8, wherein the processor is further configured to perform:
determining that the touch operation comprises a plurality of slide operations and the plurality of slide operations act on the to-be-processed interface; and
in accordance with determining that the touch operation comprises the plurality of slide operations which act on the to-be-processed interface, using content associated with the plurality of slide operations as the copied content.

14. The user equipment according to claim 8, wherein the processor is further configured to perform:
detecting, after the touch operation ends, one more touch operation acting on the target area;
determining that a time length for which the one more touch operation has been in contact with the touchscreen reaches a preset time length;
in accordance with determining that the time length reaches the preset time length, displaying an operation menu comprising a pasting option; and
obtaining the pasting instruction when the pasting option is selected.

15. The user equipment according to claim 8, wherein the processor is further configured to perform:
detecting, after the touch operation ends, one more touch operation acting on the target area;
determining that a fingerprint used for the one more touch operation is the second preset fingerprint; and
in accordance with determining that the fingerprint is the second preset fingerprint, obtaining the pasting instruction.

16. The method according to claim 1, wherein the touch operation comprises a first tapping operation and a second tapping operation, and
wherein selecting copied content from the to-be-processed interface based on the touch operation acting on the touchscreen comprises:
selecting a first tapping location from an area in which the first tapping operation is in contact with the touchscreen, wherein the first to-be-recognized fingerprint is a fingerprint used for the first tapping operation;
obtaining the second tapping operation after it is detected that the first tapping operation ends;
determining that a fingerprint used for the second tapping operation is a second preset fingerprint;
in accordance with determining that the fingerprint is the second preset fingerprint, selecting a second tapping location from an area in which the second tapping operation is in contact with the touchscreen, wherein the second preset fingerprint is different from the first preset fingerprint;
determining that content associated with the first tapping location and content associated with the second tapping location both belong to the to-be-processed interface; and
in accordance with determining that the contents belong to the to-be-processed interface, selecting the copied content from the to-be-processed interface based on the first tapping location and the second tapping location.

17. The user equipment according to claim 8, wherein the touch operation comprises a first tapping operation and a second tapping operation, and the processor is further configured to perform:
selecting a first tapping location from an area in which the first tapping operation is in contact with the touchscreen, wherein the first to-be-recognized fingerprint is a fingerprint used for the first tapping operation;
obtaining the second tapping operation after it is detected that the first tapping operation ends;
determining that a fingerprint used for the second tapping operation is a second preset fingerprint;
in accordance with determining that the fingerprint is the second preset fingerprint, selecting a second tapping location from an area in which the second tapping operation is in contact with the touchscreen, wherein the second preset fingerprint is different from the first preset fingerprint;
determining that content associated with the first tapping location and content associated with the second tapping location both belong to the to-be-processed interface; and
in accordance with determining that the contents belong to the to-be-processed interface, selecting the copied content from the to-be-processed interface based on the first tapping location and the second tapping location.

18. A non-transitory, computer readable medium storing instructions, that, when executed by a processor, configure the processor to provide at least the following operations:
obtaining a first to-be-recognized fingerprint;
determining that the first to-be-recognized fingerprint is a first preset fingerprint;
selecting copied content from a to-be-processed interface in response to a touch operation acting on a touchscreen;
pasting the copied content into a target area in response to obtaining a pasting instruction; and
clearing the copied content in response to detecting a slide operation in a non-pastable area of the to-be-processed interface, wherein detecting the slide operation is one of the following:

i. detecting a speed at which a touch object moves to a side of the screen is greater than a preset speed; or ii. detecting a double-tapping operation acting on an editable area of the to-be-processed interface.

19. The non-transitory, computer readable medium according to claim 18, wherein obtaining the first to-be-recognized fingerprint comprises:

obtaining a fingerprint used for the touch operation in response to detecting a touch operation the touchscreen; and using the fingerprint used for the touch operation as the first to-be-recognized fingerprint.

20. The non-transitory, computer readable medium according to claim 18, wherein obtaining the first to-be-recognized fingerprint comprises:

detecting a touch operation acting on the touchscreen;

determining that an operation area of the touch operation is an interface of a preset application program run on a foreground;

in accordance with determining the operation area is the interface, awakening a fingerprint sensor; and obtaining a fingerprint used for the touch operation, and using the fingerprint used for the touch operation as the first to-be-recognized fingerprint.

* * * * *